United States Patent
Leung et al.

(10) Patent No.: US 7,418,536 B2
(45) Date of Patent: *Aug. 26, 2008

(54) PROCESSOR HAVING SYSTOLIC ARRAY PIPELINE FOR PROCESSING DATA PACKETS

(75) Inventors: Arthur Tung-Tak Leung, Saratoga, CA (US); Anthony Li, Los Altos, CA (US); William Lynch, La Honda, CA (US); Sharad Mehrotra, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/326,253

(22) Filed: Jan. 4, 2006

(65) Prior Publication Data
US 2006/0117126 A1  Jun. 1, 2006

Related U.S. Application Data

(63) Continuation of application No. 10/177,187, filed on Jun. 20, 2002, now Pat. No. 7,069,372.

(60) Provisional application No. 60/309,087, filed on Jul. 30, 2001.

(51) Int. Cl.
*G06F 13/36* (2006.01)
(52) U.S. Cl. .................. 710/306; 710/38; 712/10; 712/11; 712/19; 709/238
(58) Field of Classification Search ......... 710/305–306, 710/311–317, 36–38; 709/238–250; 708/520–524; 712/18–27, 10–15
See application file for complete search history.

(56) References Cited

U.S. PATENT DOCUMENTS

| 5,524,258 | A | 6/1996 | Corby, Jr. et al. |
| 5,734,649 | A | 3/1998 | Carvey et al. |
| 5,781,772 | A | 7/1998 | Wilkinson, III et al. |

(Continued)

OTHER PUBLICATIONS

"What's Inside a Router?", http://www-net.cs.umass.edu/kurose/network/inside/inside.htm, (observed Aug. 29, 2005), 11 pgs.

(Continued)

*Primary Examiner*—Raymond N Phan
(74) *Attorney, Agent, or Firm*—Schwegman, Lundberg & Woessner, P.A.

(57) ABSTRACT

A processor for use in a router, the processor having a systolic array pipeline for processing data packets to determine to which output port of the router the data packet should be routed. In one embodiment, the systolic array pipeline includes a plurality of programmable functional units and register files arranged sequentially as stages, for processing packet contexts (which contain the packet's destination address) to perform operations, under programmatic control, to determine the destination port of the router for the packet. A single stage of the systolic array may contain a register file and one or more functional units such as adders, shifters, logical units, etc., for performing, in one example, very long instruction word (vliw) operations. The processor may also include a forwarding table memory, on-chip, for storing routing information, and a cross bar selectively connecting the stages of the systolic array with the forwarding table memory.

17 Claims, 22 Drawing Sheets

U.S. PATENT DOCUMENTS

| | | | |
|---|---|---|---|
| 5,787,430 A | 7/1998 | Doeringer et al. | |
| 5,802,278 A * | 9/1998 | Isfeld et al. | 709/249 |
| 5,838,894 A | 11/1998 | Horst | |
| 5,905,725 A | 5/1999 | Sindhu et al. | |
| 5,909,440 A | 6/1999 | Ferguson et al. | |
| 5,920,699 A | 7/1999 | Bare | |
| 5,923,643 A | 7/1999 | Higgins et al. | |
| 5,930,256 A | 7/1999 | Greene et al. | |
| 6,011,795 A | 1/2000 | Varghese et al. | |
| 6,018,524 A | 1/2000 | Turner et al. | |
| 6,078,963 A | 6/2000 | Civaniar et al. | |
| 6,091,725 A | 7/2000 | Cheriton et al. | |
| 6,101,192 A | 8/2000 | Wakeland | |
| 6,161,139 A | 12/2000 | Win et al. | |
| 6,212,184 B1 | 4/2001 | Venkatachary et al. | |
| 6,308,219 B1 | 10/2001 | Hughes | |
| 6,430,181 B1 | 8/2002 | Tuckey | |
| 6,453,413 B1 * | 9/2002 | Chen et al. | 713/2 |
| 6,526,055 B1 | 2/2003 | Perlman et al. | |
| 6,614,789 B1 | 9/2003 | Yazdani et al. | |
| 6,631,419 B1 | 10/2003 | Greene | |
| 6,658,002 B1 | 12/2003 | Ross et al. | |
| 6,675,187 B1 | 1/2004 | Greenberger | |
| 6,687,781 B2 | 2/2004 | Wynne et al. | |
| 6,721,316 B1 | 4/2004 | Epps et al. | |
| 6,731,633 B1 | 5/2004 | Sohor et al. | |
| 6,732,203 B2 | 5/2004 | Kanapathippillai et al. | |
| 6,751,191 B1 | 6/2004 | Kanekar et al. | |
| 6,778,490 B1 | 8/2004 | Achilles et al. | |
| 6,785,728 B1 | 8/2004 | Schneider et al. | |
| 6,795,886 B1 | 9/2004 | Nguyen | |
| 6,801,950 B1 | 10/2004 | O'Keeffe et al. | |
| 6,804,815 B1 | 10/2004 | Kerr et al. | |
| 6,859,455 B1 | 2/2005 | Yazdani et al. | |
| 6,879,559 B1 | 4/2005 | Blackmon et al. | |
| 6,922,724 B1 | 7/2005 | Freeman et al. | |
| 6,944,183 B1 | 9/2005 | Iyer et al. | |
| 6,944,860 B2 | 9/2005 | Schmidt | |
| 6,961,783 B1 | 11/2005 | Cook et al. | |
| 6,965,615 B1 * | 11/2005 | Kerr et al. | 370/474 |
| 6,973,488 B1 | 12/2005 | Yavatkar et al. | |
| 6,990,527 B2 | 1/2006 | Spicer et al. | |
| 7,006,431 B1 | 2/2006 | Kanekar et al. | |
| 7,020,718 B2 | 3/2006 | Brawn et al. | |
| 7,028,098 B2 | 4/2006 | Mate et al. | |
| 7,031,320 B2 | 4/2006 | Choe | |
| 7,043,494 B1 | 5/2006 | Joshi et al. | |
| 7,051,039 B1 | 5/2006 | Murthy et al. | |
| 7,051,078 B1 | 5/2006 | Cheriton | |
| 7,054,315 B2 | 5/2006 | Liao | |
| 7,054,944 B2 | 5/2006 | Tang et al. | |
| 7,069,372 B1 | 6/2006 | Leung, Jr. et al. | |
| 7,073,196 B1 | 7/2006 | Dowd et al. | |
| 7,095,713 B2 | 8/2006 | Willhite et al. | |
| 7,103,708 B2 | 9/2006 | Eatherton et al. | |
| 7,111,071 B1 | 9/2006 | Hooper | |
| 7,124,203 B2 | 10/2006 | Joshi et al. | |
| 7,139,238 B2 | 11/2006 | Hwang | |
| 7,155,518 B2 | 12/2006 | Forslow | |
| 7,159,125 B2 | 1/2007 | Beadles et al. | |
| 7,185,365 B2 | 2/2007 | Tang et al. | |
| 7,200,144 B2 | 4/2007 | Terrell et al. | |
| 7,200,865 B1 | 4/2007 | Roscoe et al. | |
| 7,203,171 B1 | 4/2007 | Wright | |
| 7,225,204 B2 | 5/2007 | Manley et al. | |
| 7,225,263 B1 | 5/2007 | Clymer et al. | |
| 7,227,842 B1 | 6/2007 | Ji et al. | |
| 7,230,912 B1 | 6/2007 | Ghosh et al. | |
| 7,231,661 B1 | 6/2007 | Villavicencio et al. | |
| 7,239,639 B2 | 7/2007 | Cox et al. | |
| 7,249,374 B1 | 7/2007 | Lear et al. | |
| 7,257,815 B2 | 8/2007 | Gbadegesin et al. | |
| 7,274,702 B2 | 9/2007 | Toutant et al. | |
| 7,280,975 B1 | 10/2007 | Donner | |
| 7,302,701 B2 | 11/2007 | Henry | |
| 2002/0035639 A1 | 3/2002 | Xu | |
| 2003/0108056 A1 | 6/2003 | Sindhu et al. | |
| 2003/0163589 A1 * | 8/2003 | Bunce et al. | 709/250 |
| 2004/0024888 A1 | 2/2004 | Davis et al. | |
| 2006/0159034 A1 | 7/2006 | Talur et al. | |

OTHER PUBLICATIONS

"Xelerated Packet Devices", *MicroDesign Resources Presentation, Network Processor Forum*, (Jun. 14, 2001), 11 pgs.

Belenkiy, A., "Deterministic IP Table Lookup at Wire Speed", *The Internet Global Summit (INET '99)*, http://www.isoc.org/inet99/proceedings/4j/4j_2.htm, (observed May 12, 2003),18 pgs.

Cataldo, A. , "Net Processor Startup Takes Pipelined Path to 40 Gbits/s", EETimes.com, (Jul. 2, 2001), 2 pgs.

Chiueh, T.-C. , et al., "High-Performance IP Routing Table Lookup Using CPU Caching", *Proceedings, Eighteenth Annual Joint Conference of the IEEE Computer and Communication Societies (INFOCOM '99)*, vol. 3, (1999), 1421-1428.

Degermark, M., et al., "Small Forwarding Tables for Fast Routing Lookups", *Proceedings, ACM SIGCOMM '97*, (1997), 3-14.

Gupta, P. , et al., "Routing Lookups in Hardware at Memory Access Speed", *Proceedings, Seventeen Annual Joint Conference of the IEEE Computer and Communications Societies (INFOCOM '98)*, vol. 3, (1998), 1240-1247.

Kung, H. T., et al., "Algorithms for VLSI Processor Arrays", *In: Introduction to VLSI Systems*, Mead, C., et al., Editors, Addison-Wesley, Reading, MA,(1980), 271-292.

Lampson, B., et al., "IP Lookups Using Multiway and Multicolumn Search", *IEEE/ACM Transactions on Networking*, 7(3), (Jun. 1999),324-334.

Lindberg, K., "Multi-Gigabit Routers", *Proceedings, HUT Internetworking Seminar*, http://www.tml.hut.fi/Opinnot/Tik-110.551/1998/papers/02MultiGigabitRouter/paper.html, (observed May 12, 1998), 14 pgs.

McAuley, A. J., et al., "Fast Routing Table Lookup Using CAMs", *Proceedings, Twelfth Annual Joint Conference of the IEEE Computer and Communications Societies, Networking: Foundation for the Future (INFOCOM '93)*, vol. 3, (1993), 1382-1391.

Partridge, C. , et al., "A 50-Gb/s IP Router", *IEEE/ACM Transactions on Networking*, 6(3), (Jun. 1998), 237-248.

Waldvogel, M., et al., "Scalable High Speed IP Routing Lookups", *Proceedings, ACM SIGCOMM '97*, (1997), 25-36.

"U.S. Appl. No. 10/177,187, Final Office Action mailed Jun 29, 2005", 9 p.

"U.S. Appl. No. 10/177,187, Non-Final Office Action mailed Oct. 18, 2004", 13 p.

"U.S. Appl. No. 10/177,187, Notice of Allowance mailed Sep. 22, 2005", 6 p.

"U.S. Appl. No. 10/177,187, Response filed Apr. 18, 2005 to Non-Final Office Action mailed Oct. 18, 2004", 9 p.

"U.S. Appl. No. 10/177,187, Response filed Aug. 29, 2005 to Final Office Action mailed Oct. 18, 2004", 10 p.

Ballardie, A. , "Core Based Trees (CBT) Multicast Routing Architecture", *RFC 2201*, (September 1997), 1-15.

Finseth, C. , "An Access Control Protocol, Sometimes Called TACACS", *RFC 1492*, (Jul. 1993), 1-21.

Gupta, P. , et al., "Classifying Packets With Hierarchical Intelligent Cuttings", *IEEE Micro*, 21(1), (Jan./Feb., 2000),34-41.

Gupta, P. , et al., "Packet Classification on Multiple Fields" , *Proceedings of the Conference on Applications, Technologies, Architectures, and Protocols for Computer Communication (ACM SIGCOMM '99)*, (1999), 147-160.

Kille, S. , "Representing the O/R Address Heirarchy in the X.500 Directory Information Tree", *RFC 2294*, (Mar. 1998), 1-13.

Lakshman, T. V., et al., "High-Speed Policy-Based Packet Forwarding Using Efficient Multi-Dimensional Range Matching", *Proceed-* ings of the Conference on Applications, Technologies, Architectures, and Protocols for Computer Communications (ACM SIGCOMM '98), 203-214.

Myers, J., "IMAP4 ACL Extension", RFC 2086, (Jan. 1997), 1-8.

Qui, L., et al., "Fast Firewall Implementations for Software and Hardware-Based Routers", Microsoft Technical Report MSR-TR-2001-61, (Jun. 2001), 18 pgs.

Srinivasan, V., et al., "Fast Scalable Layer Four Switching", Proceedings of the Conference on Applications, Technologies, Architectures, and Protocols for Computer Communications (ACM SIGCOMM '98), (1998), 191-202.

Srinivasan, V., et al., "Packet Classification Using Tuple Space Search", Proceedings of he Conference on Applications, Technologies, Architectures, and Protocols (ACM SIGCOMM'99), (1999), 135-146.

Stokes, E., et al., "Access Control Requirements for LDAP", RFC 2820, (May 2000), 1-9.

Wijnen, B., et al., "View-Based Access Control Model (VACM) for the Simple Network Management Protocol (SNMP)", RFC 2575, (Apr. 1999), 1-38.

* cited by examiner

PROCESSOR HAVING SYSTOLIC ARRAY PIPELINE FOR PROCESSING DATA PACKETS

CROSS-REFERENCE TO RELATED APPLICATIONS

This is a Continuation of U.S. patent application Ser. No. 10/177,187, filed Jun. 20, 2002, now U.S. Pat. No. 7,069,372, issued on Jul. 27, 2006, entitled "PROCESSOR HAVING SYSTOLIC ARRAY PIPELINE FOR PROCESSING DATA PACKETS", which claims priority under 35 U.S.C. 119(e) to U.S. provisional patent application Ser. No. 60/309,087, filed Jul. 30, 2001, entitled "PROCCESSING UNIT FOR EFFICIENTLY DETERMINING A PACKET'S DESTINATION IN A PACKET-SWITCHED NETWORK," the disclosure of which is hereby incorporated by reference in its entirety. This application is also related to the co-pending, commonly assigned U.S. provisional patent application Ser. No. 60/309,042 entitled "PACKET ROUTING AND SWITCHING DEVICE," filed on Jul. 30, 2001, the disclosure of which is hereby incorporated by reference in its entirety.

FIELD OF THE INVENTION

This invention relates, in general, to microprocessors, and in particular, to processing devices for determining the next hop/destination and output port for a packet in a packet-switched network.

BACKGROUND OF THE INVENTION

Packet switched networks, such as the Internet, divide a message or a data stream transmitted by a source into discrete packets prior to transmission. Upon receipt of the packets by the recipient, the packets are recompiled to form the original message or data stream. As a packet-switched network, the Internet is comprised of various physical connections between computing devices, servers, routers, sub-networks, and other devices which are distributed throughout the network.

Routers connect networks, and each router has multiple inputs and multiple outputs coupled to independent network devices such as servers or other routers, the connections being made through communications links such as optical fibers or copper wires or the like.

Routers receive the packets being sent over the network and determine the next hop or segment of the network to which each packet should be sent through one of the ports of the router. When the router passes the packet to the next destination in the network, the packet is one step closer to its final destination. Each packet includes header information indicating the final destination address of the packet.

Conventionally, routers include memories and microprocessors therein for processing the packets received by the routers, as well as for performing other functions required of the router. Typically, routers contain one or more route processors, one or more forwarding engines, and a switch fabric. The route processor is a dedicated embedded subsystem which is responsible for communicating with the neighboring routers in the network to obtain current and ever-changing information about the network conditions. The route processor forms a routing table which is downloaded into and subsequently accessed for forwarding packets by the forwarding engine(s).

The forwarding engine of the router is responsible for determining the destination address and output port within the router to which to direct the received packet, this determination conventionally being made by accessing a routing table containing routing information for the entire network and performing a look-up operation.

One example of a conventional forwarding engine 10 for a router is shown in FIG. 1, wherein a plurality of general purpose CPUs 12 are provided in the architecture for the forwarding engine. Each CPU is a separate integrated circuit and receives packet data, and each CPU processes individual packets by performing a forwarding or lookup operation using an external SRAM 14 having a forwarding lookup table stored therein. As packets are received from the network, they are stored in a very large input buffer memory 16 on the front end of the forwarding engine for temporary storage until a CPU can remove a packet from the buffer and perform the forwarding/lookup operation. Such a system is commonly referred to as being "input striped," wherein the packets are written into the input buffer memory 16 sequentially as they are received, but maybe processed in a non-sequential order as the CPUs 12 become available for processing.

Conventionally, determining the destination port within the router to which to send the received packet is a computationally intensive process, particularly in view of the high data rates of the network (known as the "line rate"), such as 10 gigabits/second. At this line rate, a forwarding engine within a router must make the destination port determination for approximately 30 million minimum-sized IP packets per second per port. Accordingly, as the router receives multiple packets, a conventional forwarding engine utilizes the large buffer memory 16 on its front end, as shown in FIG. 1, to temporarily store a number of packets until the path is determined of the packet presently being processed by the forwarding engine 10.

As such, conventional forwarding engines 10 for routers can be susceptible to performance degradation if the network traffic directed at the router is high, particularly when the router receives a plurality of packets having short lengths, thereby requiring that the look-up operations be performed quickly. Further, the increasing demand for IP-centric services over the Internet, such as voice over IP, streaming video, and data transfers to wireless devices with unique IP addresses, has increased the demand for data handling by the forwarding engines.

While conventional forwarding engines typically utilize large buffer memories 16 on their front end, such buffers can overflow during such heavy network traffic conditions, thereby requiring that the router "drop" the packet. When a packet is dropped, the packet must be resent, which degrades the overall performance of the transmission of the message. Further, such forwarding engines 10 require complex mechanisms for matching the packets stored in the input large memory buffers to the destination ports of the router.

Also, in such a conventional arrangement as shown in FIG. 1, the CPUs 12 each contend for access to the external forwarding table SRAM 14 to perform the lookup operation, which can be problematic in that contention for the external SRAM 14 can provide a bottleneck which limits the system's ability to process packets quickly. Further, if an individual CPU 12 takes longer to process a packet, during this time that individual CPU is generally not available as a resource of the forwarding engine 10 to accept new packets for processing. For at least these reasons, the conventional example shown in FIG. 1 will be problematic in handling the processing of packets at higher line rates. Further, conventional input-striped routers may experience problems with keeping packets in the proper order relative to one another.

As recognized by the present inventors, what is needed is a forwarding engine microprocessor for a router which can receive packets at a line rate and process received data packets at the line rate, thereby reducing the chance that the router will drop a new packet during continuous high traffic network activity.

It is against this background that various embodiments of the present invention were developed.

SUMMARY OF THE INVENTION

According to one broad aspect of one embodiment of the present invention, disclosed herein is a processor for use in a router, the processor having a systolic array pipeline for processing data packets to determine which output port of the router the data packet should be routed. In one embodiment, the systolic array pipeline includes a plurality of programmable stages for processing packet contexts (which contain, among other things, the packet's destination address) and for performing operations under programmatic control to determine a destination port of the router for the packet. A single stage of the systolic array may contain a register file and one or more functional units such as adders, shifters, logical units, etc., for performing, in one example, very long instruction word (vliw) operations.

According to another broad aspect of the present invention, disclosed herein is a processor for use in a router, the processor having a systolic array pipeline for processing data packets to determine to which output port of the router the data packet should be routed, and an on-chip forwarding table memory which contains routing information. In one embodiment, various stages of the systolic array each have a register file and one or more functional units. Stages of the systolic array can access the forwarding table memory to perform a lookup operation to obtain information from the forwarding table memory to determine the destination port for the packet. Because in this embodiment the processor uses a systolic array arrangement as its basic engine with an on-chip forwarding table memory, packet lookup operations can be performed at line rate, therefore eliminating the need for large input buffers and input striping as used in conventional routers having conventional forwarding engines therein.

In one embodiment, in order to reduce the size of the systolic array, the systolic array is arranged into multiple execution units, each execution unit having one or more stages of the systolic array, and the packet context may be passed through an execution unit of the systolic array more than once for processing within the execution unit. Further, in another embodiment, the packet context can be passed through the entire systolic array more than once for processing therein.

Other features, utilities and advantages of the various embodiments of the invention will be apparent from the following more particular description of embodiments of the invention as illustrated in the accompanying drawings.

DETAILED DESCRIPTION OF EMBODIMENTS OF THE INVENTION

In accordance with embodiments of the present invention, disclosed herein is a network processing unit (NPU) 20 for determining the destination of a packet, the NPU employing a systolic array pipeline architecture. As used herein, the term "network processing unit" includes any processor, microprocessor, or other integrated circuit (or collections thereof)—such as a forwarding engine—which determines the destination of a packet. As will be described herein in greater detail, the NPU of one embodiment of the present invention employs one or more systolic arrays in various execution units of the NPU to perform various operations on a packet as the packet passes through the NPU.

Figure 4A:
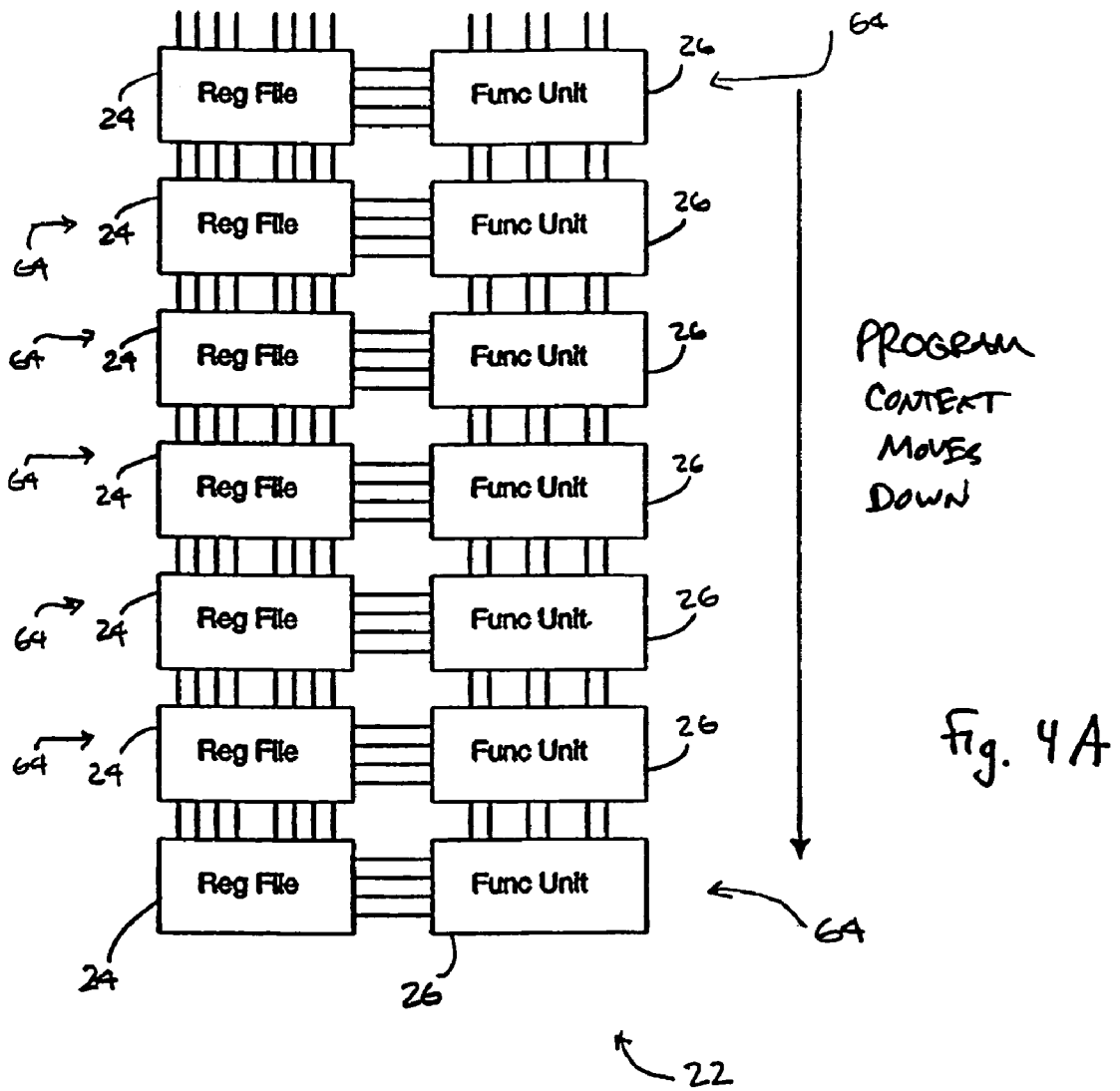
FIG. 4A illustrates a block diagram of an example of a systolic array pipeline including a plurality of stages, in accordance with one embodiment of the present invention.
Figure 4B:
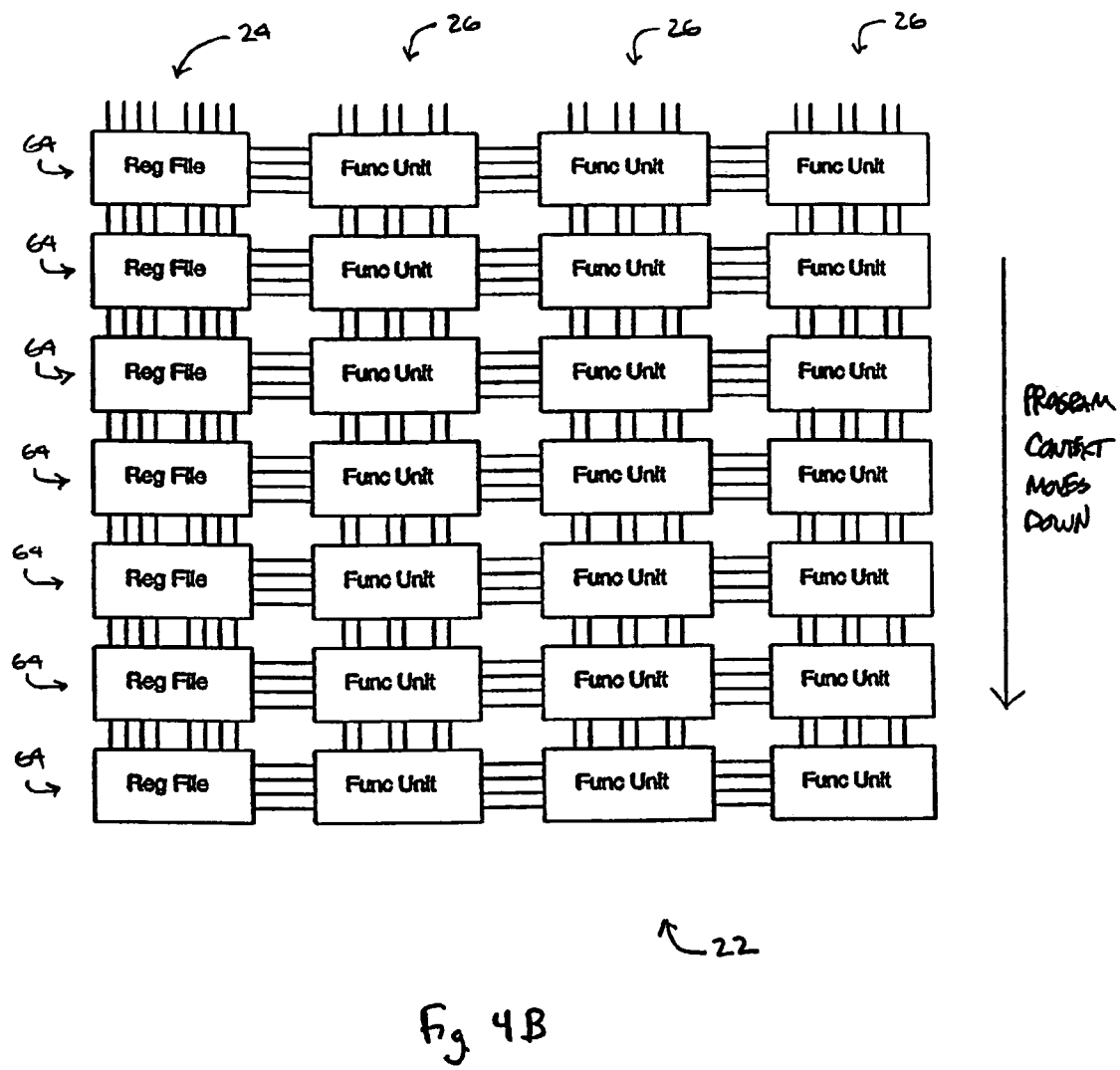
FIG. 4B illustrates a block diagram of another example of a systolic array pipeline including a plurality of stages for very long instruction words, in accordance with one embodiment of the present invention.

As used herein, the term "systolic array" or "systolic array pipeline" includes, but is not limited to, a series or collection of stages wherein each stage may contain a register file and one or more functional units. In one embodiment, the data or program context being processed by the stages—which may include items such as the state of the register files, the program counter, and/or the current state of the program—flows from a stage to a next stage. In one example, the stages of a systolic array are arranged in a generally linear or sequential order, wherein each stage is capable of performing an operation involved in processing a packet, and the data/program context processed in each stage is processed therein for one clock cycle after which the data/program context is passed to a next stage for processing therein. One example of a systolic array 22 is shown in FIG. 4A wherein each stage has a register file 24 and a functional unit 26, while FIG. 4B shows a systolic array 22 for a very long instruction word wherein each stage has a register file 24 and a plurality of functional units 26.

In one embodiment, some of the stages of the systolic array 22 are programmable to perform a processing operation involved in processing the packet under program control, while other stages of the systolic array can perform a delay operation (as with "sleep stages," discussed below) where the data passes through a stage with no processing therein. In general, on every clock cycle of the NPU 20, data/program context is moved from one stage of the systolic array 22 to the next stage in the systolic array, without blocking the intake of new packets or the processing of existing packets. As will be described below, the systolic array of the NPU 20 can receive new packets at a line rate of, for example, 40 gigabits/second, and can finish processing a packet at the line rate during steady state operation. The NPU is adapted for use in a router, where the router has multiple bi-directional ports for receiving and transmitting data into and out of the router, wherein each port is connected with different portions of the network. As mentioned above in one embodiment, when the NPU receives a packet, the NPU 20 operates to determine to which destination port of the router the packet should be sent out so that the packet gets closer to its final destination (i.e., the next hop in the network).

NPU Architecture

Figure 1:
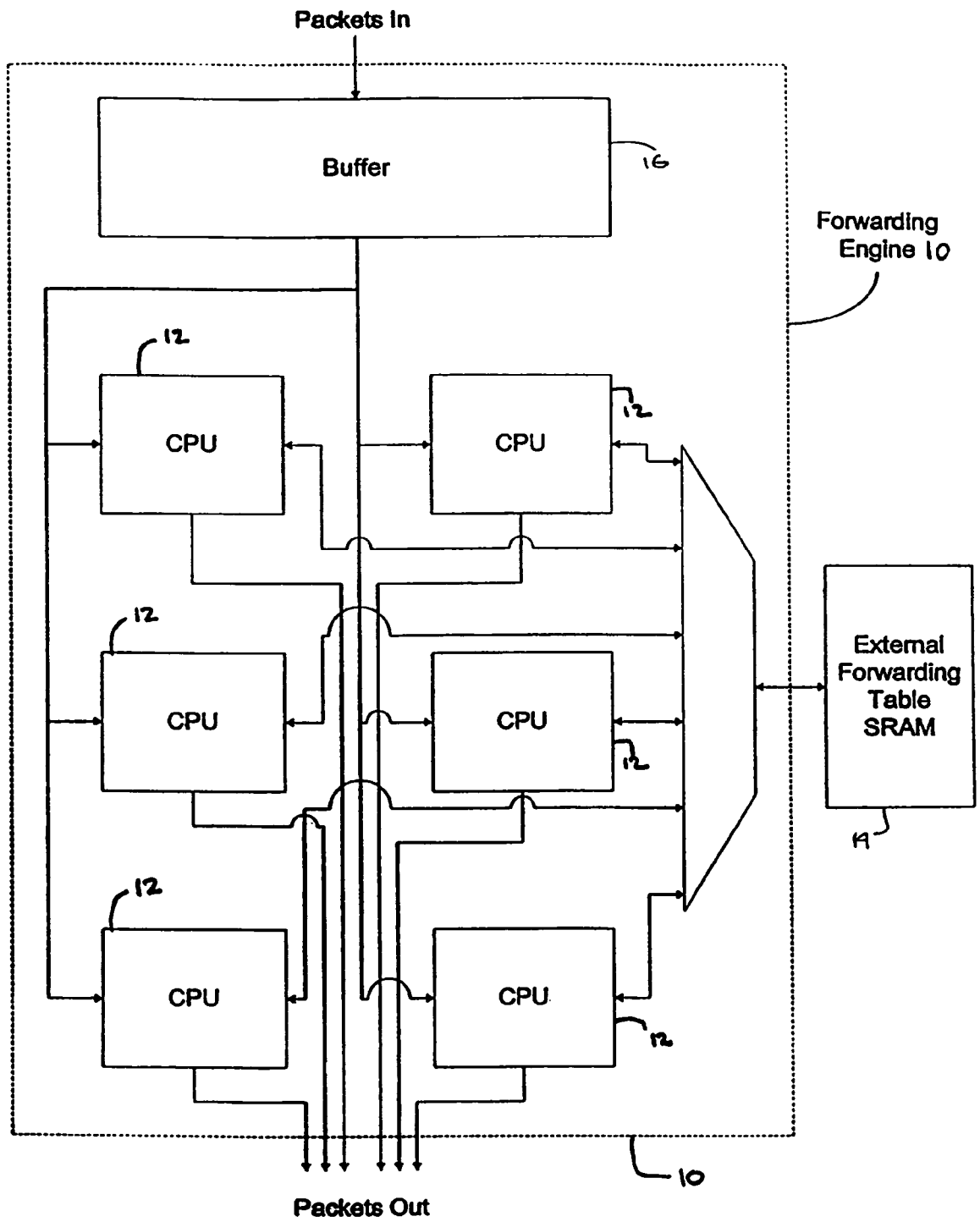
FIG. 1 illustrates a block diagram of a conventional microprocessor forwarding engine with an external forwarding table SRAM used in a conventional routing device.
Figure 2:
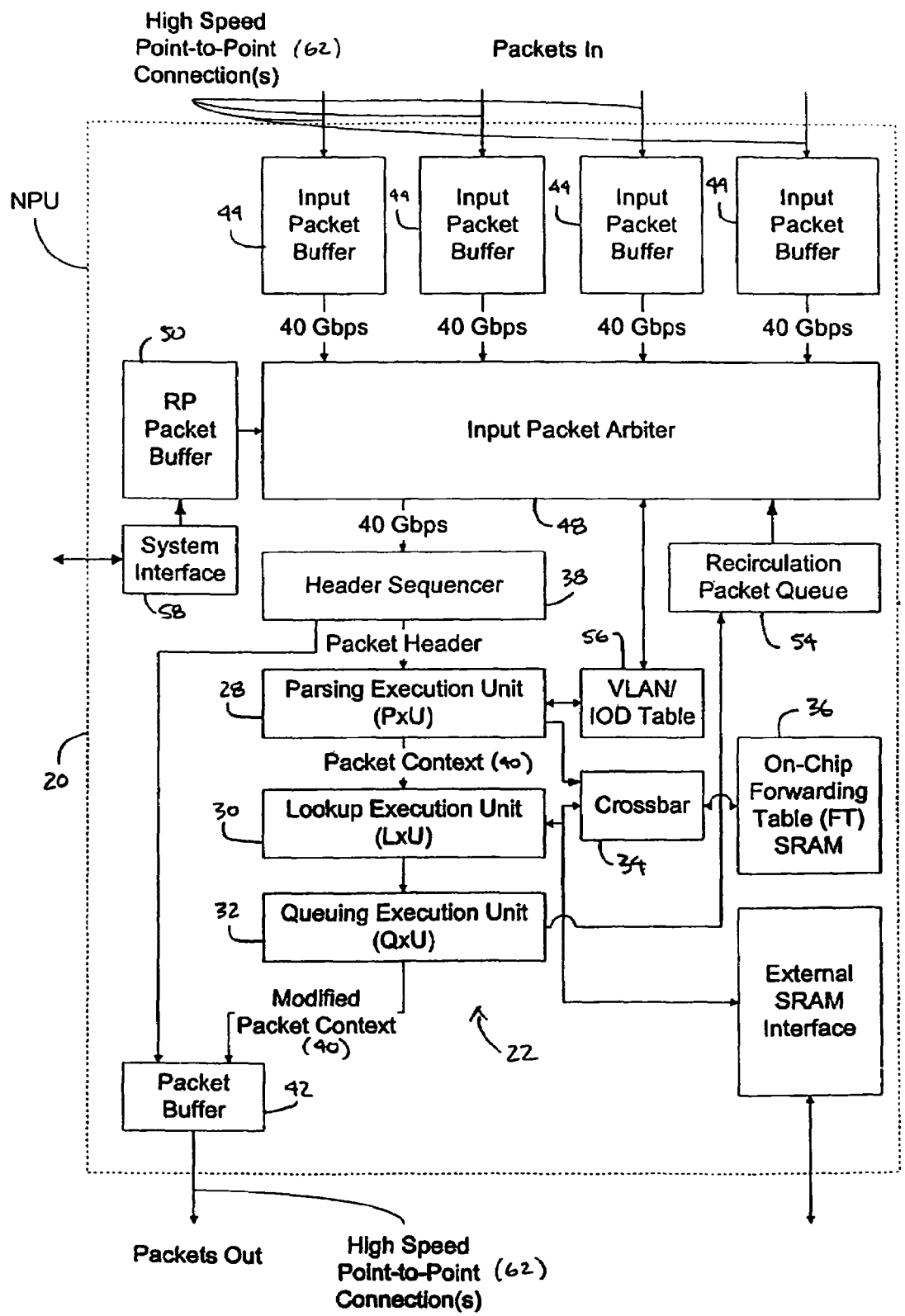
FIG. 2 illustrates a block diagram of a forwarding engine or network processing unit (NPU), in accordance with one embodiment of the present invention.

Referring now to FIG. 2, a block diagram of a network processing unit 20 is shown in accordance with one embodiment of the present invention. The NPU is implemented using a plurality of execution units, including in one example a parsing execution unit (PXU) 28 for forming a packet context which contains the destination address of the packet and other data descriptive of the packet; a lookup execution unit (LXU) 30 for determining, based on routing data for the network, the destination port of the router (also referred to herein as the output port) to which the packet should be routed; and a queuing execution unit (QXU) 32 for queuing the packet to the proper output queue (maintained outside of the NPU) corresponding to the output port of the router to which the packet should be sent. In one embodiment, each execution unit is implemented using one or more programmable stages of a systolic array, wherein the operations of the execution units are under dynamic program control. The LXU 30 accesses, through a dynamically configurable crossbar 34, an on-chip memory 36 containing the forwarding table (FT)/route information for the network.

In one example, when a packet is received by the NPU 20, a header sequencer 38 extracts the packet header from the packet and passes the packet header to the PXU 28. The PXU forms a packet context 40 which is a collection of information relating to and describing the packet that corresponds to the context. The packet context includes data such as the destination address specified in the packet header, and is derived from the packet header and other information in the packet or about the packet. After the packet context 40 has been formed in the PXU 28, the packet context is passed to the LXU 30 and QXU 32 which perform their operations on the packet context. As the packet context is passed through the LXU and QXU and processed therein, portions of the packet context are modified so as to reflect the results of the operation performed by the LXU and QXU.

The header sequencer 38 also passes the packet (in one example, the entire packet) to a packet buffer 42 where the packet is stored. As the LXU 30 and QXU 32 perform their operations using the packet context 40 and as they modify the packet context, the packet remains in the packet buffer 42 until the QXU completes its operations. Generally, after the LXU has determined the destination port to which the packet should be sent and the QXU has modified the packet context to specify the destination port and the queue to which to send the packet, unification logic merges the packet context with the respective packet stored in the packet buffer 42. In one example, both the packet context and the packet are passed out of the NPU 20 to other portions within the router where the switching functions of the router are performed and the packet is transmitted out of the router to the appropriate output port, using the appropriate data formatting and encapsulation associated with the appropriate output port.

Figure 14:
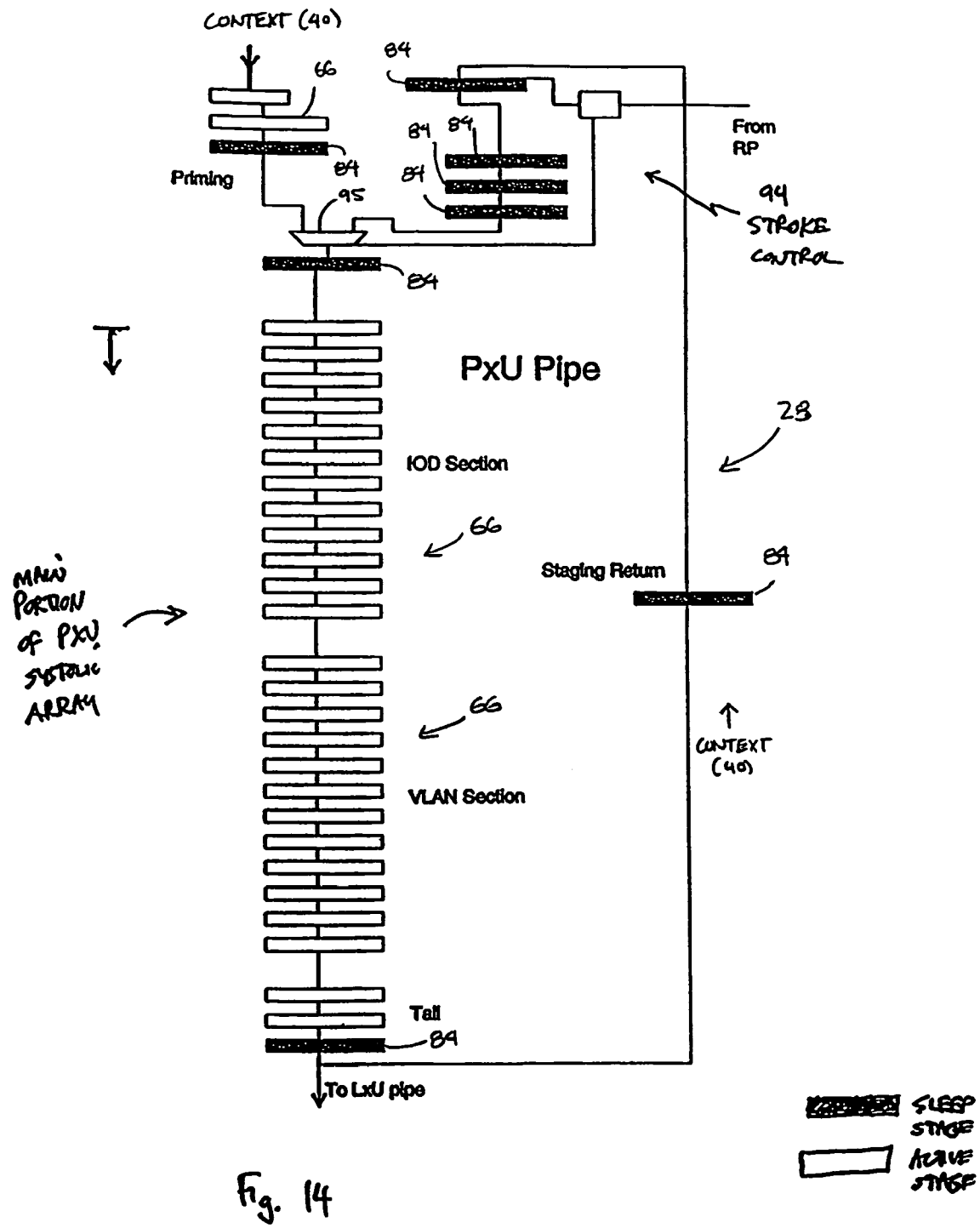
FIG. 14 illustrates a parsing execution unit (PXU) including systolic array stages, in accordance with one embodiment of the present invention.

Referring again to FIG. 2, the parsing execution unit (PXU) 28 processes a packet by programmatically extracting information from the packet such as the source address, the destination address, the source port number, the destination port number, the packet type, quality of service (QOS) data, and other data which is needed by the LXU 30 and QXU 32 to perform their operations. It is understood that since the PXU 28 is under program control, the data extracted by the PXU to form the packet context is a matter of choice depending on the particular implementation chosen and how the software is written to process packets. The PXU stores this extracted information into a register file which is accessible throughout the processor, and passes the context 40 of the packet to the LXU 30 for processing therein. One example of the PXU architecture is shown in FIG. 14, wherein the PXU is comprised of various systolic array stages.

Figure 15:
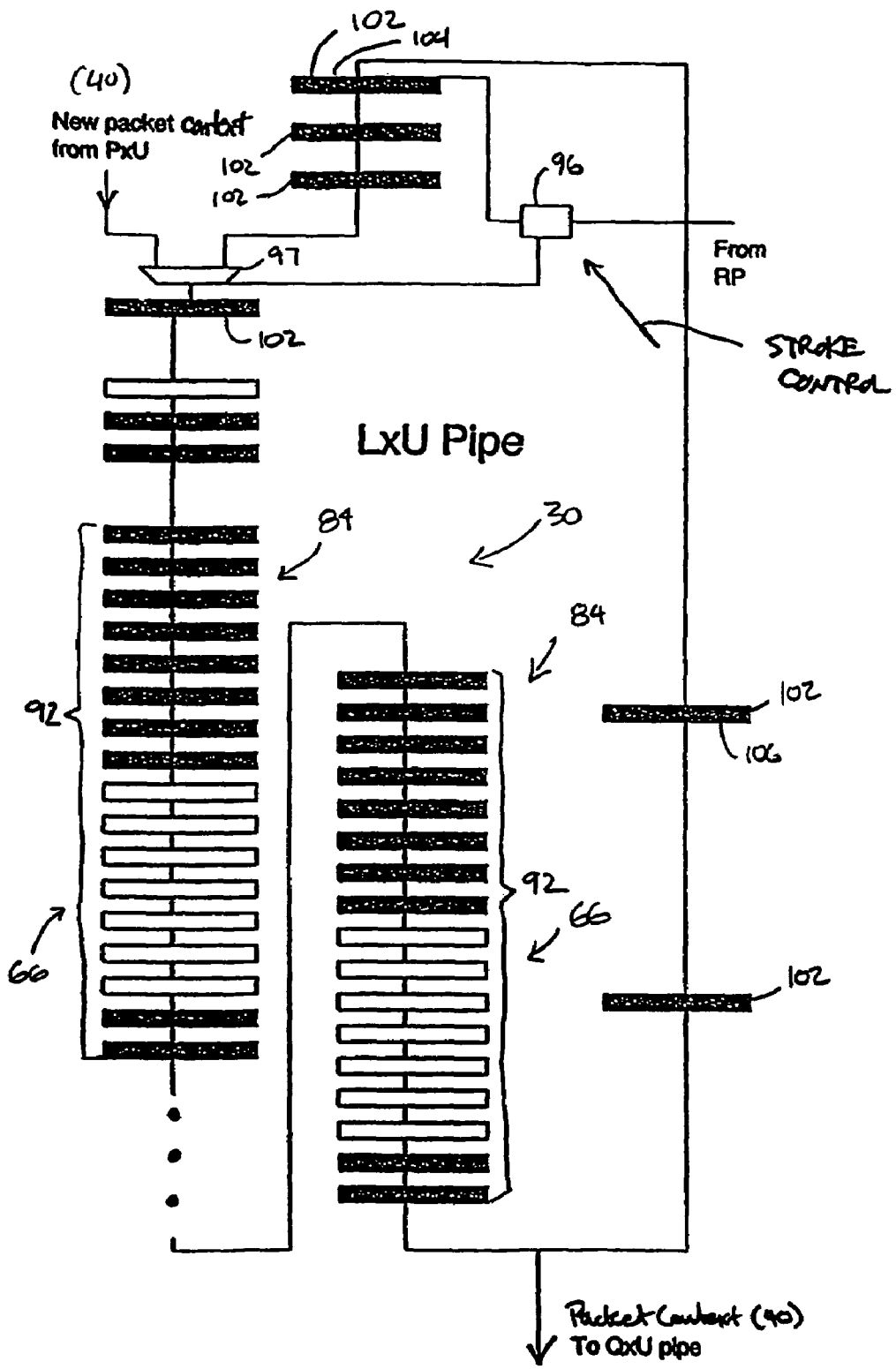
FIG. 15 illustrates a lookup execution unit (LXU) including systolic array stages, in accordance with one embodiment of the present invention.
Figure 16:
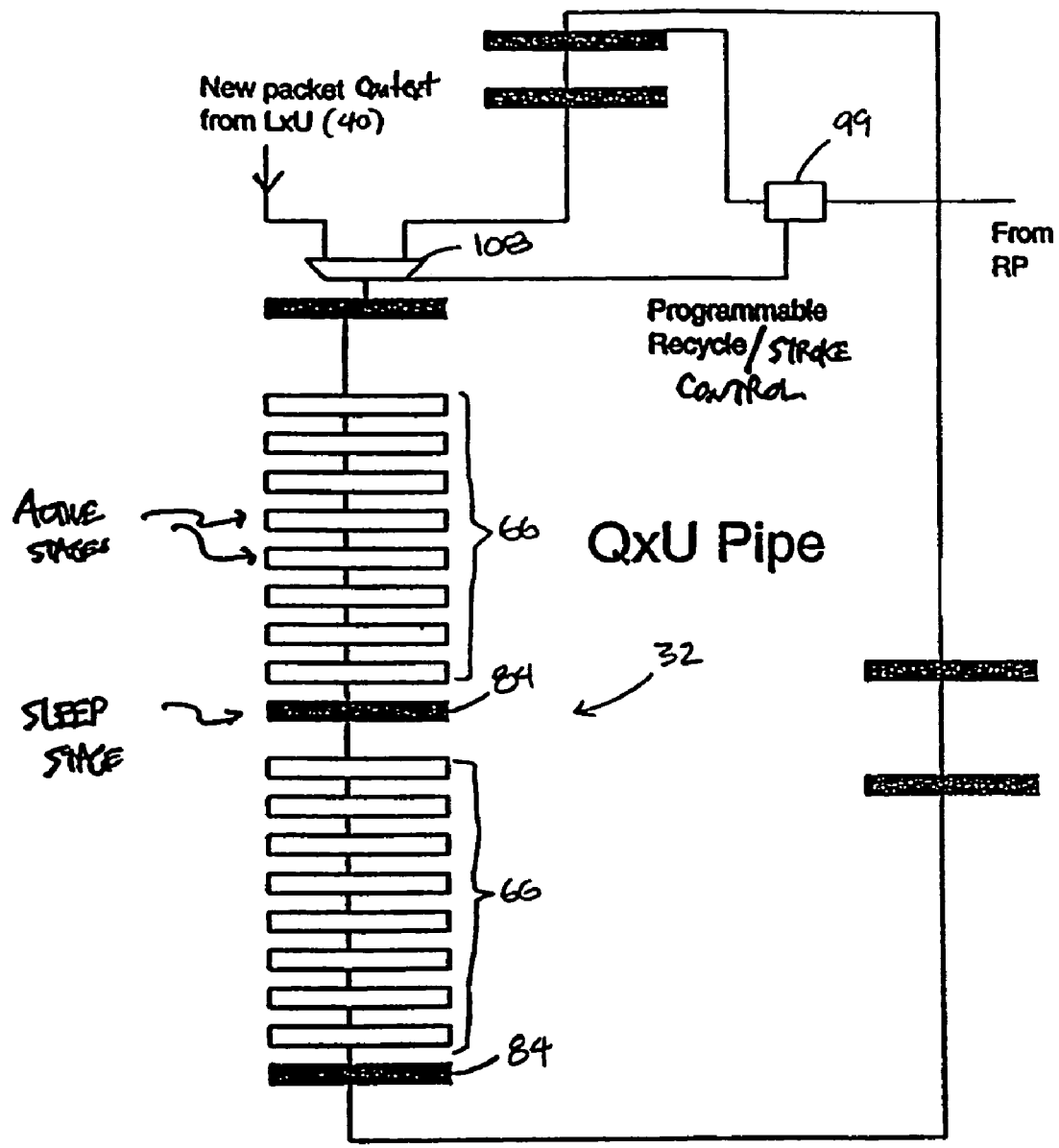
FIG. 16 illustrates a queuing execution unit (QXU) including systolic array stages, in accordance with one embodiment of the present invention.
Figure 17:
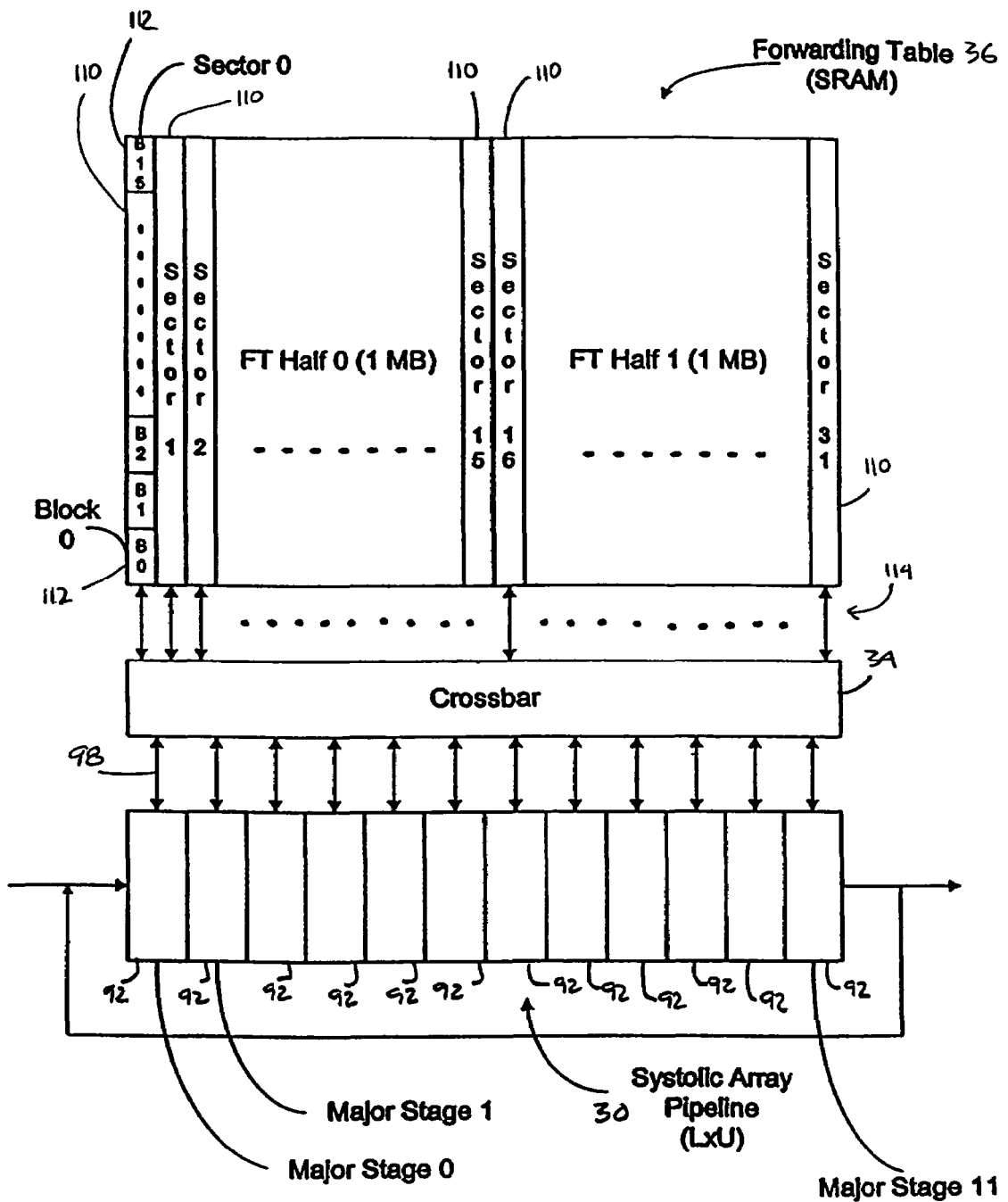
FIG. 17 illustrates a look-up topology including a look-up engine, a forwarding table crossbar, and a forwarding table, in accordance with one embodiment of the present invention.

Using the context 40 of the packet, the LXU 30 performs the necessary table lookup for forwarding the packet to the proper output port of the router, as well as to perform any quality of service (QOS) or filtering functionality. One example of the LXU architecture is shown in FIGS. 15-17, wherein the LXU is comprised of various systolic array stages. It is understood that since the LXU is under program control, the operations performed by the LXU to determine the proper output port to which to send the packet, or to perform other functions within the LXU, are a matter of choice depending on the particular implementation chosen and how the software is written to process packets.

As will be described below, in one embodiment, the LXU 30 is formed using one or more stages of a systolic array which can be represented, conceptually, as having 12 major stages, with each major stage having 8 active minor stages and 10 inactive (sleep) minor stages therein. In accordance with embodiments of the present invention, the packet's context 40 is passed, on every cycle of the NPU, from one minor stage to the next minor stage in the systolic array.

After determining the destination queue/port in the router to which to send the packet, the LXU 30 attaches the forwarding information to the context 40 for the packet, and passes the context of the packet to the QXU 32. Using the context, the QXU removes the corresponding packet from the packet buffer 42 and passes the packet and the context to a portion of the router for writing to the appropriate output queue in the router so that the packet can be transmitted out of the router on the appropriate output port.

Figure 3:
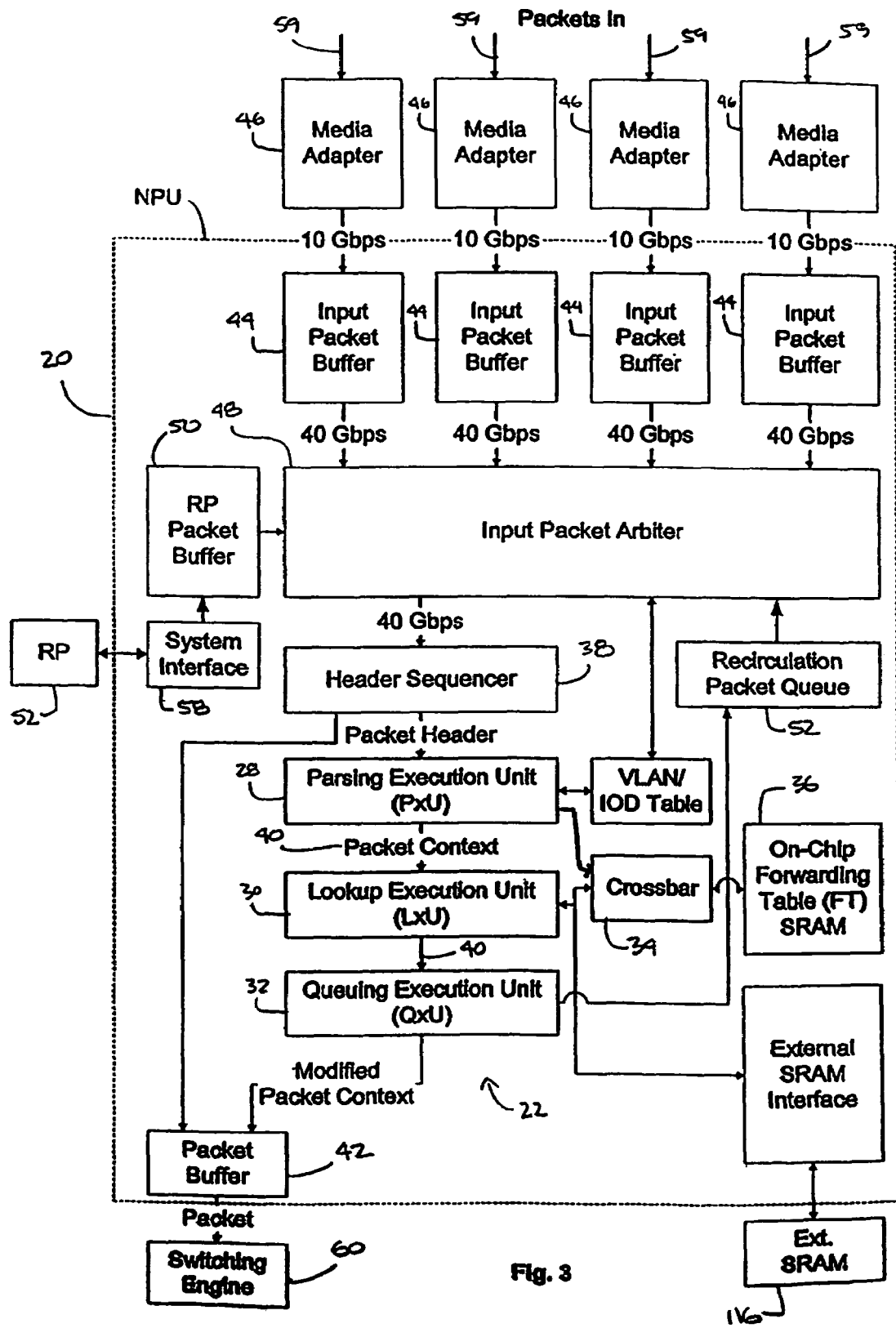
FIG. 3 illustrates another block diagram of a network processing unit coupled to various components of a router, including media adapters, a route processor, and a switching engine, in accordance with one embodiment of the present invention.

In one example of the NPU 20 shown in FIG. 2, the NPU has a set of input packet buffers (IPBs) 44, wherein each IPB is coupled with a media adapter 46 (shown in FIG. 3). Each input packet buffer is coupled with an input packet arbiter (IPA) 48, which, in general, arbitrates between the input packet buffers 44 to select packets to forward into the header sequencer 38 of the NPU for processing by the PXU 28, LXU 30, and QXU 32. The input packet buffers are FIFO buffers and accumulate an entire packet from a media adapter 46 before transmitting the packet to the IPA 48. Each input packet buffer has a 10 gigabits/sec connection with the media adapter, and a 40 gigabits/sec connection with the input packet arbiter, in one example.

The input packet buffers 44 account for rate mismatches between the media adapters 46 (10 gigabits/sec) and the input packet arbiter (40 gigabits/sec) by aggregating four 10 gigabits/sec packet streams to a 40 gigabits/sec packet stream. The IPA 48 being coupled with the input packet buffers 44 and the header sequencer 38, selects an input packet buffer for obtaining a packet, and passes the packet to the header sequencer and packet buffer 42. The IPA cycles between the various input packet buffers to obtain packets therefrom, and in this manner, the input packet arbiter creates a 40 gigabits/sec stream of packet data which is passed to the header sequencer of the NPU.

In one example, there are six sources of packets into the IPA 48; four from the media adapters 46, one from a route processor packet buffer 50 (which stores packets from a route processor 52, shown in FIG. 3), and one from a recirculation packet queue 54 (discussed in more detail below). The IPA 48 selects one source at a time for transmission to the header sequencer 38. The IPA uses a weighted round robin arbitration scheme that allows each input packet buffer 44, and the RP packet buffer 50, to send, in one example, up to 10 Kilobyte (KB) packets to the IPA before being deselected by the IPA. This allows transmission of one maximum transmission unit (MTU) size packet, which is 10 KB in one example, or a continuous stream of smaller packets to be transmitted without interruption, to the header sequencer. In one example, only entire packets are sent from an input packet buffer 44 to the IPA 48, and each input packet buffer checks if the packet about to be transmitted to the IPA has arrived in its entirety from the media adapter 46, and if not, then the next input buffer is selected for transmission to the IPA. Accordingly, in one embodiment, the input packet buffers provide at least 10 KB of storage.

Further as shown in FIG. 2, the PXU 28 accesses a VLAN/IOD table 56 which provides data relating to the format of the packet, which the PXU 28 uses in forming the packet context 40. The IPA 48 performs a look-up in the interface ordinal descriptor (IOD) table portion of the VLAN/IOD table and adds the appropriate IOD to the packet header before transmission to the header sequencer 38. The IOD specifies the type of the input port/media adapter upon which the packet was received (e.g., Ethernet). The IOD can be used for controlling metering, for example, and for use by the PXU 28 to determine how to parse the packet, as different packet data formats may require different parsing rules.

In addition, the IPA 48 counts the length of the incoming packet, and then, in one example, adds the length information to the packet header. In one embodiment, the IOD and the length are prepended to the packet, i.e., added to the beginning of the packet. The IPA also examines a checksum to determine if the packet was transmitted correctly from the media adapter 46.

The IPA 48 may also receive, from the RP packet buffer 50, packets originating from the route processor 52 (these packets are referred to herein as "RP generated packets"). The RP generated packets are encoded to pass through the NPU 20 with minimal processing, and bypass the IOD lookup because the routing protocol software (running in the route processor 52) adds the correct IOD to the packet before forwarding to the RP packet buffer 50.

The IOD table 56 is implemented using a static random access memory (SRAM) and stores information about each type of port that the router is servicing, e.g., 1 gigabit Ethernet, 10 gigabit Ethernet, etc. The route processor 52 communicates with the media adapters 46 via a system interface 58 to determine which type of ports are presently configured in the router, and then assembles the IOD table to reflect the ports that are presently configured. Accordingly, the media adapters may be dynamically connected or disconnected to/from the router to support various types of ports, and the router will be able to reconfigure itself to support the new media adapters.

In one embodiment, RP generated packets are handled differently than packets transmitted from the media adapters 46 to the input packet buffers 44. RP generated packets are stored in the RP packet buffer 50 until there is a break in the stream of packets leaving the IPA 48, or in one example, until a time-out before being serviced by the IPA 48. If the time-out (which can be programmatically set) occurs, then the RP generated packet is prioritized over all packets and the RP generated packet is transmitted to the PXU 28.

Referring to FIG. 3, the block diagram shows one example of an NPU 20 coupled with various components of a router, including: the set of media adapters 46, wherein each media adapter is connected to a physical line or link 59 of the network; the route processor 52, which provides updated route information for use in the forwarding table 36; and a switching engine 60 which is responsible for switching the packet to the proper destination port of the router for transmission therefrom, in accordance with one embodiment of the present invention. The router discussed herein is described in the commonly assigned, co-pending application entitled "Packet Routing and Switching Device," referenced above, the disclosure of which is incorporated by reference.

As shown in FIG. 3, the output portion of the NPU passes the packets to the switching engine 60 of the router which is responsible for switching the packet to the proper destination port of the router for transmission therefrom. In one example of the router, the router has a number of destination queues in which packets are temporarily stored before the router transmits the packets on the appropriate outgoing link. In one embodiment, each queue corresponds to a port of the router (the appropriate outgoing link), and has a priority which can be programmatically assigned thereto.

In accordance with one embodiment of the present invention, the destination queue for the packet is assigned by the NPU 20 before the packet is transmitted to the switching engine 60. Once the packet is provided to the switching engine of the router, in a process known as cellification, the switching engine breaks the packet into a set of cells and stores the cells in the queue specified by the NPU 20 and associated with the proper output port of the router.

As mentioned above, the NPU execution units—the PXU 28, LXU 30, and QXU 32—are implemented using systolic array pipeline architectures, in one embodiment, so that operations (such as the look-up operation and memory reads) can be performed at the line rate, which eliminates the need for input-striping as with conventional routers. The NPU 20 thereby permits the packets to be stored in memory of the router as a function of the router's output port associated with the packet, which thereby permits the orderly and efficient storage and extraction of the packets to and from memory, such as by using round-robin output striping.

As shown in FIG. 2, in one embodiment of the invention, high speed serial links 62 ("point-to-point connections") are used to connect signal lines of the NPU 20 to signal lines of another integrated circuit within the router, such as with the media adapters 46. In one example, the NPU includes one or more signal lines, and a second integrated circuit in the router includes one or more signal lines. Each signal line of the NPU 20 is connected with a signal line of the second integrated circuit to form a high speed interface between the integrated circuits.

These connections 62 are used in place of traditional bus interfaces between integrated circuits, as these point-to-point connections provide a higher data rate on a per pin basis, and therefore require fewer pins of an integrated circuit to meet data rate and bandwidth requirements of interfaces between integrated circuits. For instance, an interface between integrated circuits requires a bandwidth of eight gigabits/sec, then eight pins at one gigabit/sec can be used in the point-to-point connections for the interface, as opposed to a bus running at 200 megabits/sec, which would require 40 pins to provide to eight gigabits/sec bandwidth for the interface. In this sense, the point-to-point connections are "narrow" (i.e., require fewer pins) when compared with traditional bus structures.

In one embodiment, point-to-point connections 62 are implemented using differential pairs of conductors to form I/O channels for the integrated circuits used in the router of the present invention. These point-to-point I/O channels provide the interfaces between integrated circuits used in the router. For example, in one embodiment, the outputs of the NPU 20 integrated circuit can be configured using the point-to-point connections to form an output channel from the NPU 20 to the inputs of another integrated circuit in the router. Likewise, the inputs of the NPU integrated circuit can be configured using the point-to-point connections to form an input channel coupled with the integrated circuits on the front-end of the router (such as the ICs that reside in the media adapter 46).

In one embodiment, these high speed, narrow (reduced pins) point-to-point connections 62 are integrated on-chip as part of each integrated circuit which is part of the interface. For instance, the high-speed serial point-to-point differential pair links are integrated within the output portion of the NPU 20, and are also integrated within the input portion of another integrated circuit connected with the NPU. Where the core of the integrated circuit uses signal lines arranged in parallel, a parallel-to-serial conversion is provided on-chip, and error-correction encoding/decoding can be used to ensure data accuracy through the conversion operation.

In one example of the NPU 20, the outputs of the NPU can be configured using the point-to-point connections to form an output channel from the NPU to the other integrated circuit(s) connected therewith, as described in the co-pending above-referenced patent application, incorporated by reference herein.

Systolic Array

The systolic array structures of the NPU 20 will now be described with reference to FIGS. 4-13, in accordance with one embodiment of the present invention. Referring to FIGS. 4A and 4B, various embodiments of a systolic array pipeline 22 are illustrated. In the embodiment of FIG. 4A, a systolic array pipeline 22 is shown as an interconnected series of stages 64 wherein each stage has a functional unit 26 and an associated register file 24, and data/program context moves from one stage to a next stage of the systolic array. As data/program context is processed by a first functional unit of a first stage, the results of the operation(s) are written to a register file so that they are accessible by one or more subsequent stages. In one embodiment, a stage 64 may have multiple functional units such as arithmetic logic units (ALUs), adders, shifters, edge detectors, zero detectors, condition code registers, status registers, and the like. In another embodiment, a stage of the systolic array of the NPU 20 can be either an active stage—which has programmable functionality for performing various operations on the data/program context passed into the active stage—or a sleep stage which is in effect a delay stage such as a flip flop or other similar configuration, which is provided for timing.

FIG. 4B illustrates a systolic array pipeline 22 for handling very long instruction words, wherein each stage 64 comprises a register file 24 and a plurality of functional units 26 to perform various functions or instructions on data/program context received from a prior stage. Again, as with FIG. 4A, as data/program context is processed by a first stage, the results are passed onto and made available for subsequent stages.

Figure 5:
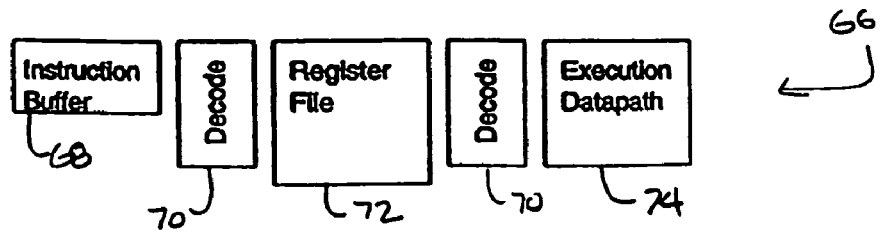
FIG. 5 illustrates a block diagram of one example of a stage within a systolic array, in accordance with one embodiment of the present invention.

FIG. 5 illustrates an example of an active stage 66 of a systolic array 22, in accordance with one embodiment of the present invention. As shown in FIG. 5, an active stage of a systolic array includes, in one example of the invention, an instruction buffer 68, decode logic 70, a register file 72, and an execution data path 74. The instruction buffer 68 provides instructions to be fed, dynamically if desired, into the register file 72 for the particular stage of the systolic array, so that the instruction can be fetched and used within the active stage of the systolic array.

Figure 6:
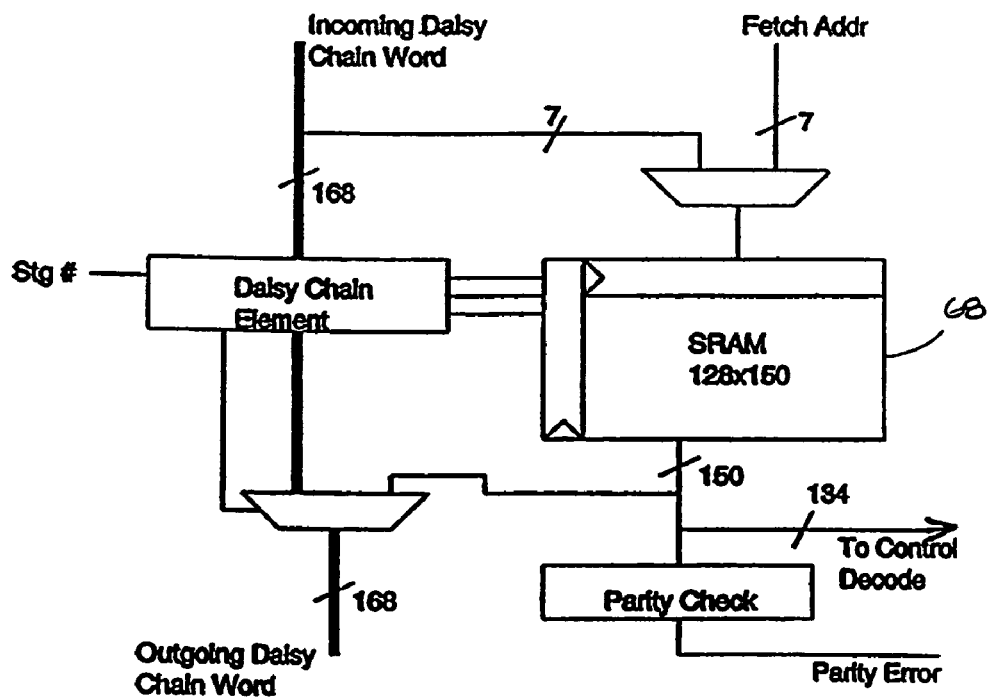
FIG. 6 illustrates a block diagram of an example of an instruction buffer of a stage of a systolic array, in accordance with one embodiment of the present invention.

As shown in FIG. 6, the instruction buffer SRAM 68 receives a program image, in one example from the route processor 52, containing one or more instructions for a particular stage 66 for storage within the SRAM instruction buffer. During a particular instruction cycle, the fetch address is used to extract an instruction from the instruction buffer of the stage of the systolic array, and upon extracting the instruction from the instruction buffer, the instruction is passed to decoding logic of the stage so that the instruction can be processed by the arithmetic logic unit (ALU) (or other element of the execution data path 74). By providing an instruction buffer as shown in FIG. 6, the software for one or more stages 64 of the systolic array 22 can be modified dynamically by changing the microcode in each stage or of any stage of the systolic array, at any time, without pausing the operations of the systolic array. In one example, an instruction buffer is provided for each active stage 66 of a systolic array in the NPU 20. In one example, the instruction buffer supports 128 entries, each 142 bits wide, with 136 data bits and six parity bits.

Figure 7:
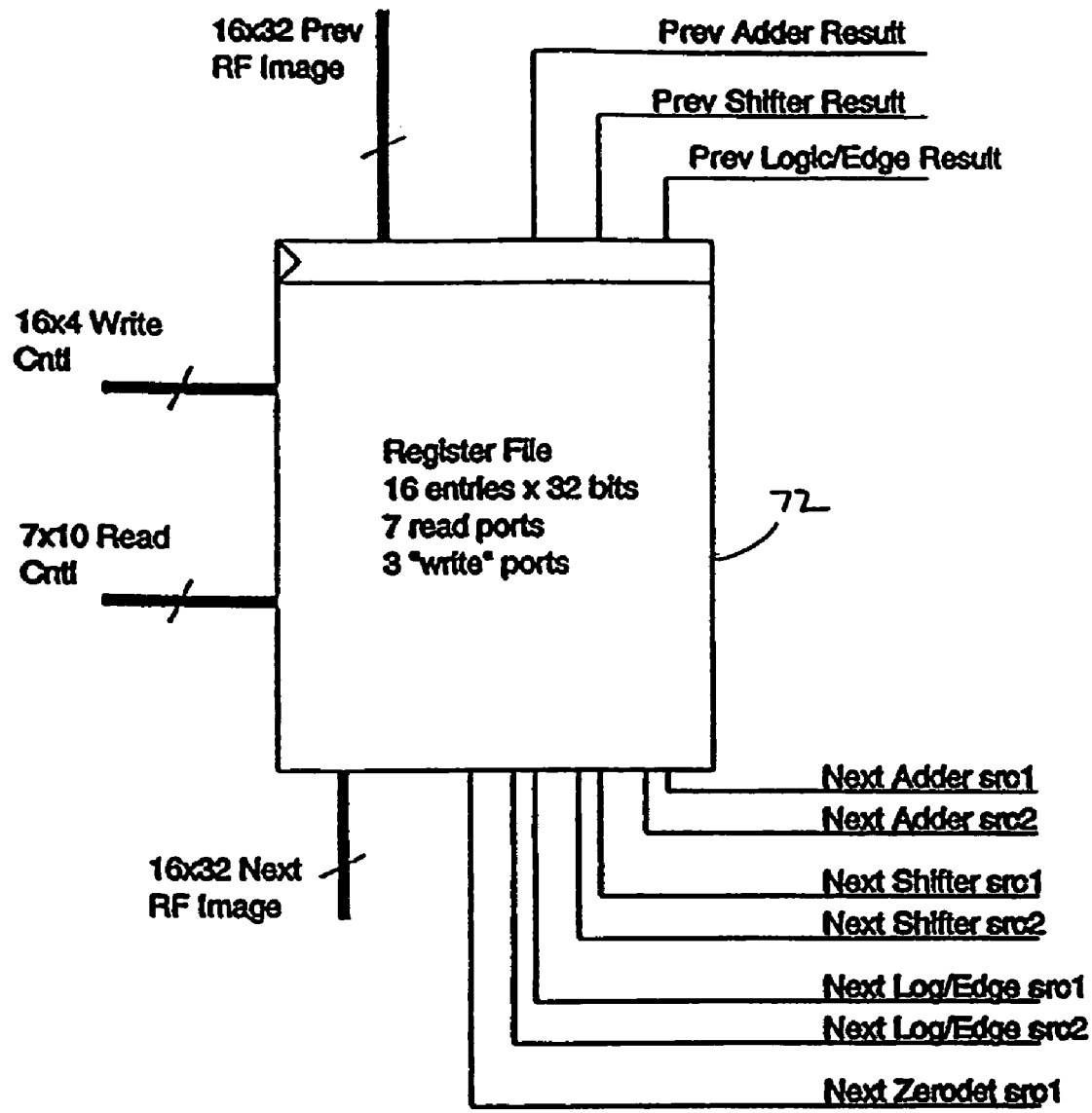
FIG. 7 illustrates an example of a register file of a stage of a systolic array, in accordance with one embodiment of the present invention.

Referring now to FIG. 7, a register file 72 of an active stage 66 of the systolic array 22 is illustrated, in accordance with one embodiment of the present invention. As shown in FIG. 7, the register file 72 for a particular stage receives inputs, such as program context, from the execution data path 74 of the prior stages (i.e., results from the previous adder, shifter, etc.), or from the previous stage's register file. The register file of a stage also provides data/program context to the register file of the subsequent stage in the systolic array, as well as making data/program context available to the next stage's execution data path (i.e., the source registers of the next stage's adder, shifter, etc.). In one embodiment, the register file 72 of a stage can support 16 entries, each of 32 bits, and has seven read ports and three write ports.

Figure 8A:
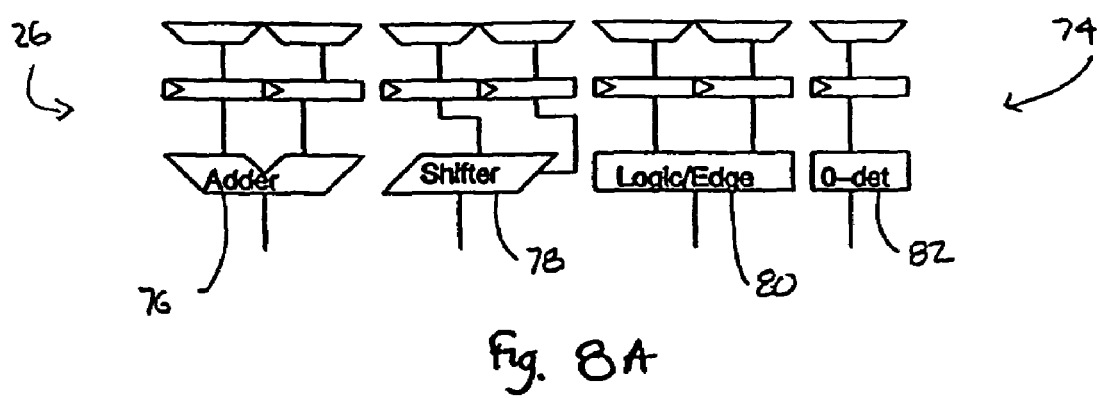
FIG. 8A shows one example of functional units of an execution data path of a stage of a systolic array, in accordance with one embodiment of the present invention.
Figure 8B:
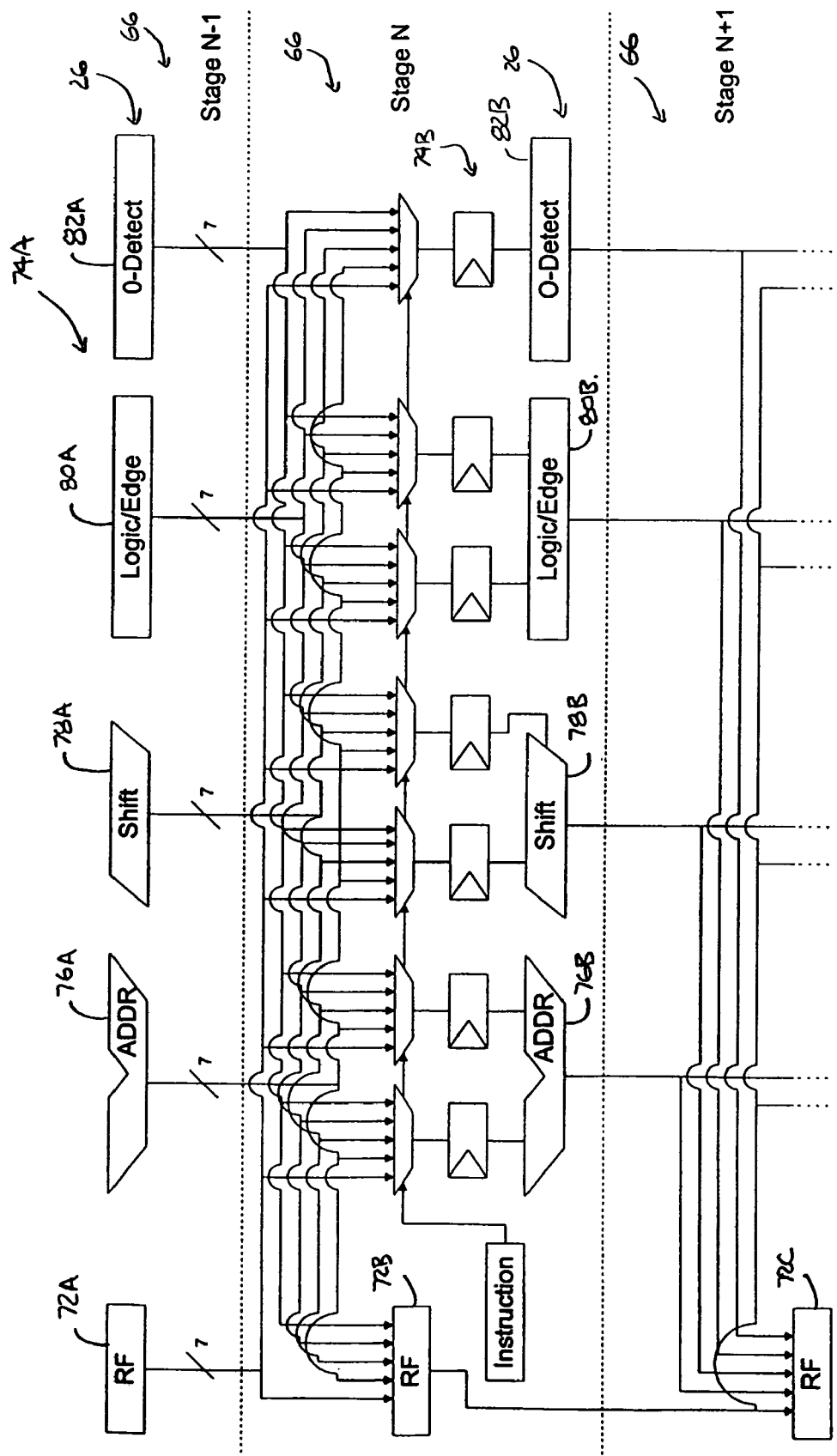
FIG. 8B shows one example of the interactions between functional units of stage N−1, stage N, and stage N+1 of a systolic array, in accordance with one embodiment of the present invention.

Referring now to FIGS. 8A-8B, the execution data path 74 of an active stage 66 of the systolic array 22 is illustrated, in accordance with one embodiment of the present invention. As shown in FIG. 8A, the execution data path of an active stage may include an adder 76, a shifter 78 (i.e., a barrel shifter), logic for detecting a leading edge or "1" of a trie 80, a zero detector 82, and other elements such as a branch unit, a condition code register stack, a status register, load data registers, and specialized units used in the trie walk. The edge detection logic, in one example, locates a leading "1" of a trie, so that the results of the edge detection logic can be used by the systolic array to search the trie, as will be described below with reference to the look-up operation.

Since each active stage 66 in the systolic array may have multiple functional units 26, the stage can be programmed to perform simultaneous operations using more than one of the functional units in the stage—such as add, shift, XOR for example—to implement very long instruction words.

FIG. 8B shows the interrelation of the functional units 26 and the register files 24 of a series of adjacent active stages 66 of a systolic array, in accordance with one embodiment of the present invention. With reference to Stage N, it can be seen that each component of the execution data path 74 receives, as inputs, the results (i.e., program context) from each of the units of the prior stage's execution data path, in one embodiment of the invention. For instance, the adder 76B of Stage N receives the results from the adder 76A, shifter 78A, logic/edge detection 80A, and zero detect units 82A of the execution data path 74A of Stage N−1. Further, the units of the execution data path 74B of Stage N also receive as inputs the image from the register file 72A of the prior Stage N−1. The register file image from Stage N−1 is also made available to the register file 12B of Stage N, and the image of the register file of Stage N is made available to the register file 72C of Stage N+1.

Also, it can be seen in FIG. 8B that the results from the execution data path 74B of Stage N are made available both to the register file 72C of stage N+1, as well as to the inputs of the execution data path elements of Stage N+1, in accordance with one embodiment of the present invention.

Figures 9A, 9B:
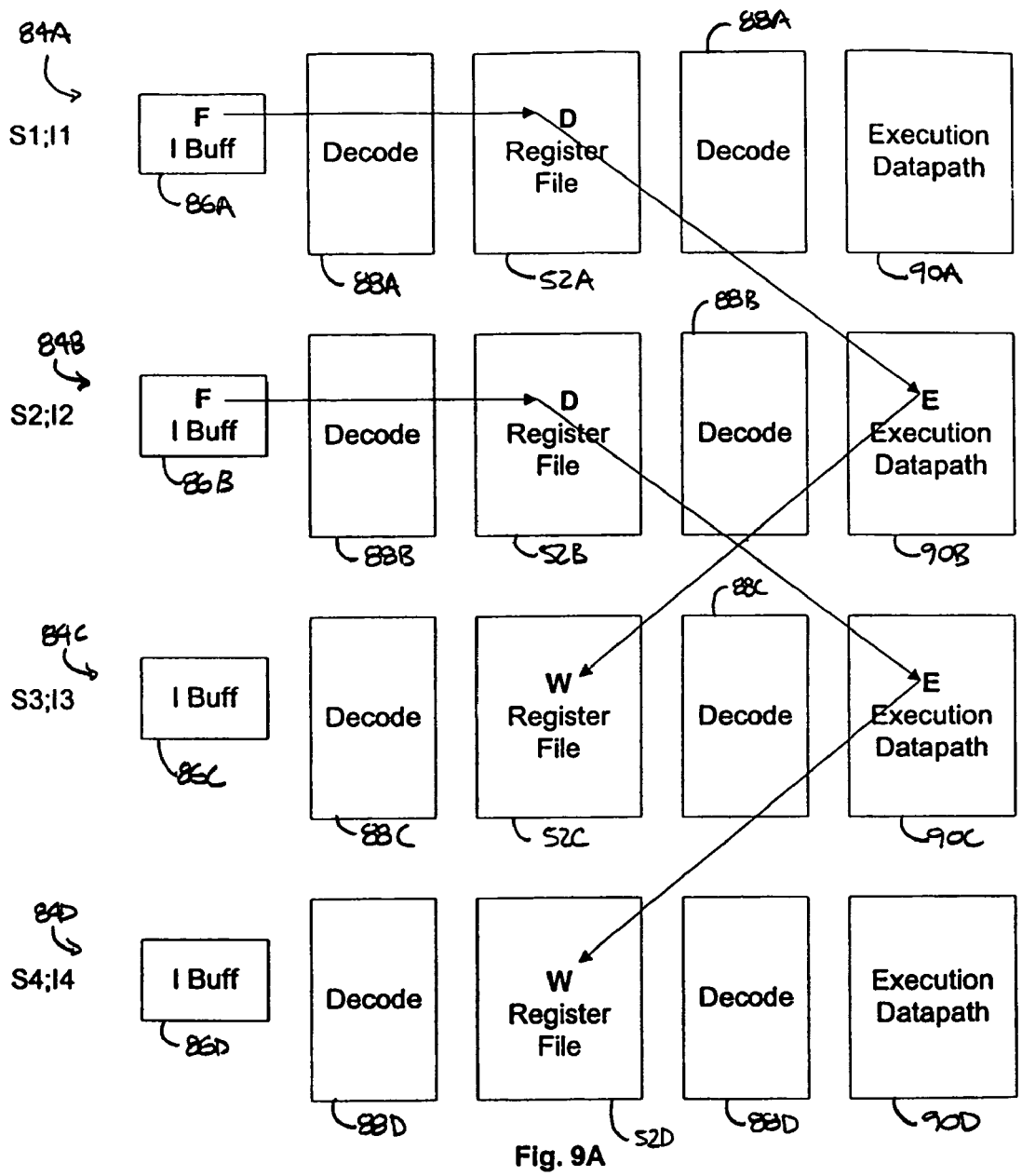
FIG. 9A illustrates an example of processing of instructions I1, I2 through a plurality of stages S1, S2, S3, S4 in a systolic array, in accordance with one embodiment of the present invention.
FIG. 9B illustrates an example of processing of instructions through a plurality of stages over various cycles in a systolic array, in accordance with one embodiment of the present invention.

FIGS. 9A and 9B illustrate the interaction of instructions and the register files through the cycles of an instruction within a systolic array, in accordance with one embodiment of the present invention. Referring to FIG. 9A, four stages (66A-66D) are shown as S1, S2, S3, and S4, and each stage has an instruction associated therewith, shown as I1, I2, I3, and I4. Each stage is shown with an instruction buffer (68A-68D), decode logic (70A-70D), a register file (72A-72D), and an execution data path (74A-74D), as shown in FIG. 5, and it is assumed that the stages are arranged so that stage 2 follows stage 1, stage 3 follows stage 2, etc. FIG. 9B illustrates the fetch, decode, execute and write operations of the instructions I1 to I4 of FIG. 9A, as phase operations are distributed over cycles of the systolic array. As can be seen, for instance, with instruction 1 (I1), the fetch operation occurs in the first cycle of stage 1 (66A), the instruction is decoded and the register file 72A is read in the second cycle (i.e., the source operands are read), the instruction is executed in the execution data path 74B of the next stage 66B of the systolic array during the third cycle; and, the results of the operations performed at the execution data path are written to the register file 72C of stage 3 (66C) during the fourth cycle.

Similarly, for instruction 2 (I2) at systolic array stage 2 (66B), the instruction is fetched and decoded, executed in the execution data path 74C of stage 3 (66C), and the results are written to the register file 72D of stage 4 (66D), in accordance with one embodiment of the present invention. Accordingly, it can be seen that at steady state, the execution data path 74 of each active stage 66 is capable of executing an instruction per each clock cycle, and writes the results of the execution to the register file 72 of the subsequent stage during the next cycle.

Figure 10:
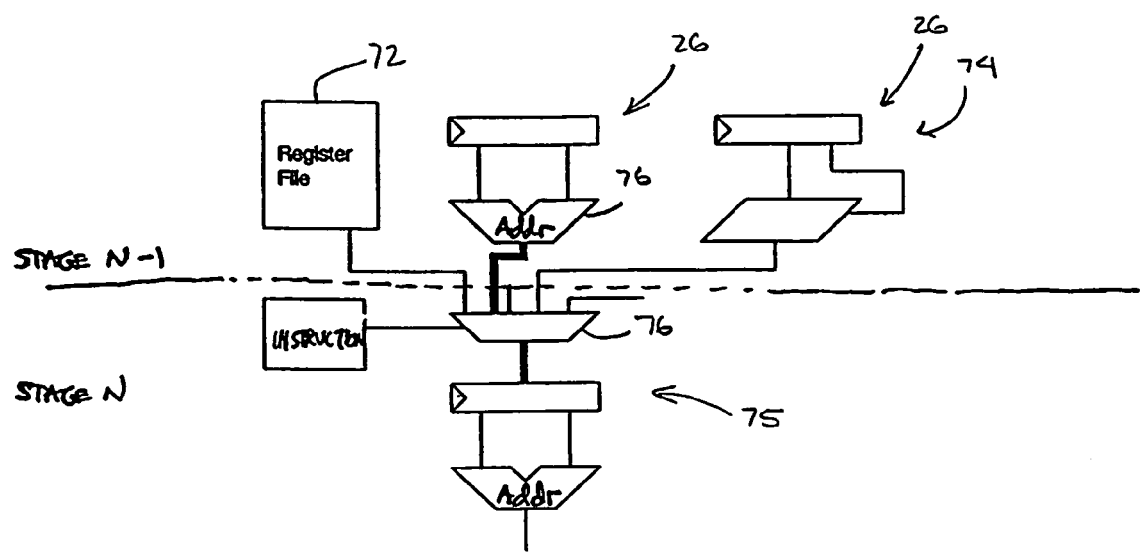
FIG. 10 illustrates an example of named bypassing for handling register dependencies in a systolic array, in accordance with one embodiment of the present invention.
Figure 11:
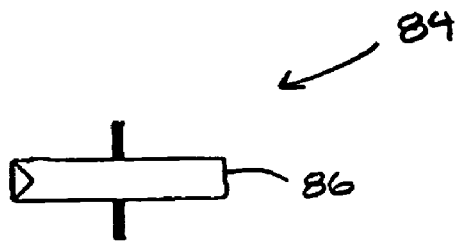
FIGS. 11A-C illustrate various examples of sleep stages of a systolic array, in accordance with one embodiment of the present invention.
Figure 11:
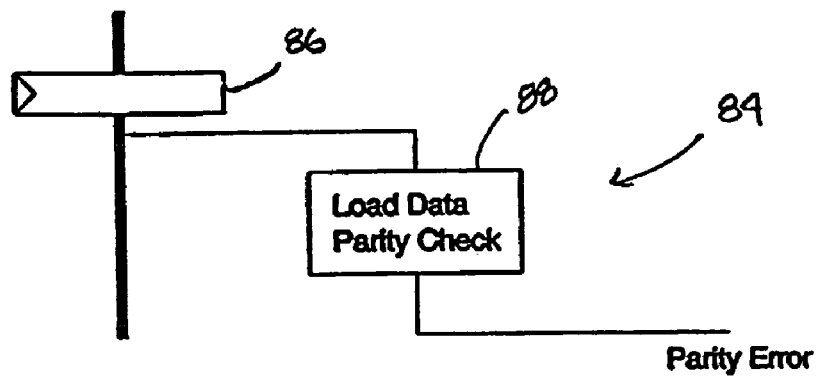
Figure 11:
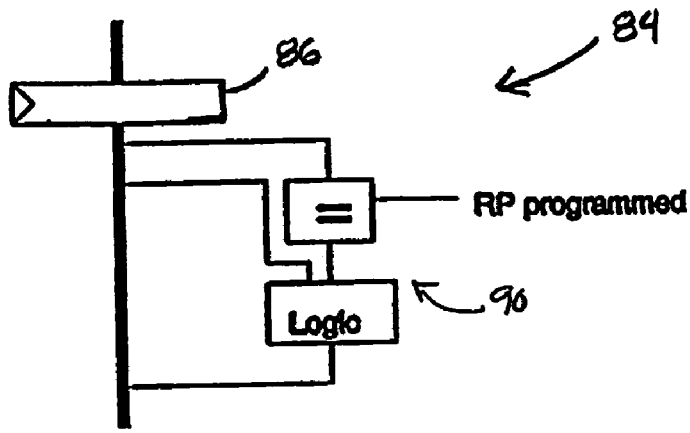

FIG. 10 illustrates named bypassing logic 75, which can be performed with the systolic array in accordance with one embodiment of the present invention. Named bypassing is used to handle instances where a registered dependency exists in the software (i.e., where a subsequent stage needs, as an input, the results from the immediately preceding stage). In one embodiment of the invention, each active stage 64 of the systolic array is capable of accepting an instruction which specifies, as a source operand, the direct results from the execution data path 74 of the immediately preceding stage 64 of the systolic array 22. In other words, as shown in FIG. 8B, the adder 76 of Stage N could receive, as a source operand specified in software, either a register from the register file 72 of Stage N−1, or the data provided by one of the elements of the execution data path 74 of the prior Stage N−1. In effect, named bypassing permits a stage of the systolic array to request a result from a functional unit 26 of a preceding stage, instead of waiting one or more cycles to read the results from the register file 72.

In addition to active stages 66, the systolic array, in one embodiment, contains inactive or "sleep stages" 84 which in effect provide delay periods within the systolic array 22. FIGS. 11A-11C illustrate various examples of sleep stages 84 used in accordance with one embodiment of the present invention. In FIG. 11A, a sleep stage 84 is shown comprising a flip flop delay 86, which provides a one cycle delay within the systolic array in one embodiment of the invention. FIG. 11B illustrates a sleep stage 84 which provides logic for parity checking 88 on previously received data and can generate a parity error if appropriate. This sleep stage is useful, for example, for stages which follow the receipt of data from, for instance, the forwarding table SRAM 36. FIG. 11C illustrates a sleep stage 84 having logic 90 for controlling the stroking of data within an execution unit of the systolic array, which will be described below. The logic determines whether a packet context should be processed again by a set of stages within the systolic array of an execution unit of the NPU 20, for purposes of "stroking" as will be described below.

Figure 12:
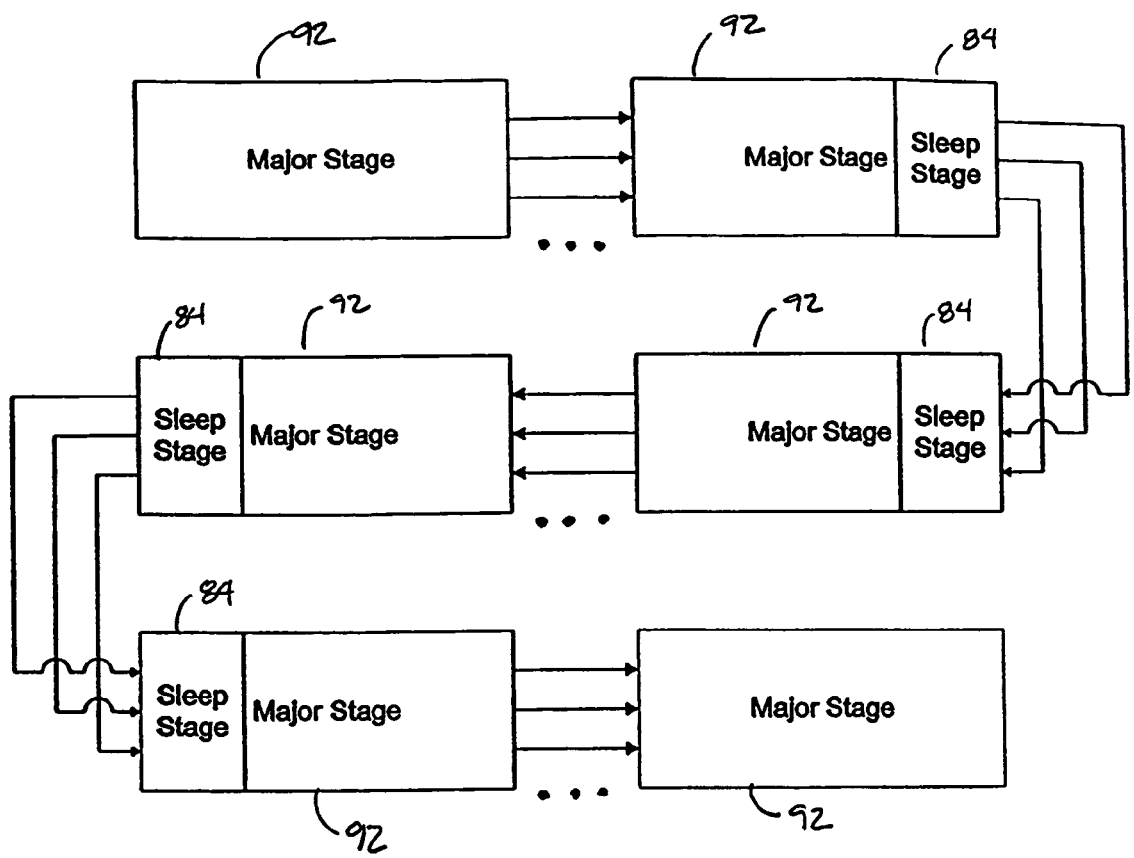
FIG. 12 illustrates an example of a physical layout of series of major stages of a systolic array, in accordance with one embodiment of the present invention.

FIG. 12 illustrates one example of a physical arrangement of a plurality of major stages 92 in the NPU 20, in accordance with one embodiment of the present invention. Because the systolic array pipeline 22 is comprised of a variety of stages 64 (both major and minor stages) with numerous interconnections between each stage, it is beneficial to arrange the major stages as shown in FIG. 12, wherein at the turns between two stages, as shown in FIG. 12, a sleep stage 84 or flip flop is provided between the output of a prior stage to the input of a subsequent stage, as shown in FIG. 12. Such a direct connection between flip flops improves performance along that turned path. For instance, a turned path may include over a thousand wires in a VLIW arrangement, and accordingly, performance is improved if there are flip flops provided between the connections of the turn.

Figure 13:
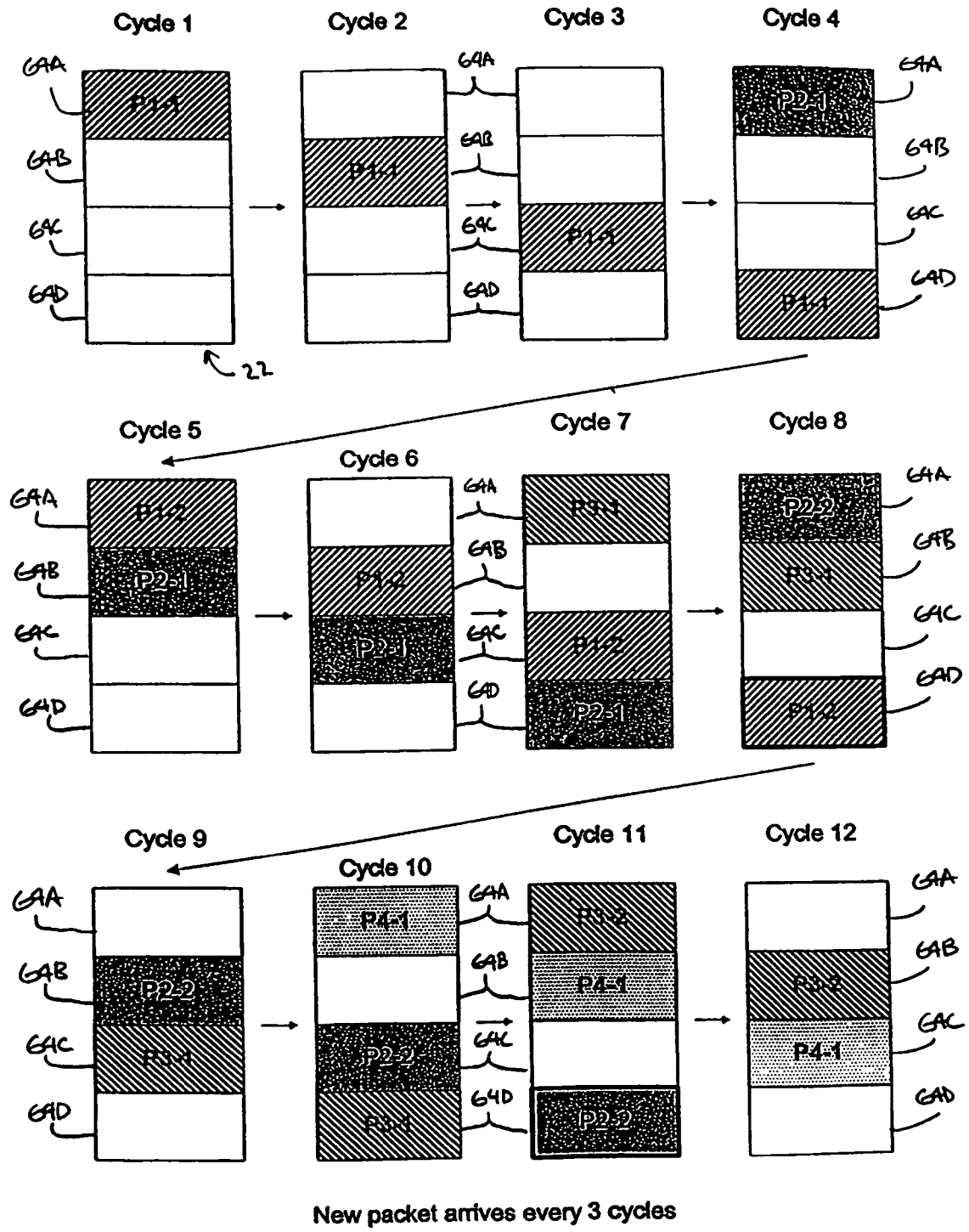
FIG. 13 illustrates an example of processing of a packet context through twelve cycles of an example four stage pipeline, in accordance with one embodiment of the present invention.

Referring now to FIG. 13, packet contexts can be stroked (processed multiple times within the systolic array of an execution unit) within the PXU 28, LXU 30, or QXU 32 of the NPU 20, in accordance with one embodiment of the present invention. In the stroking process, the packet contexts are sent through a particular execution unit (the PXU, LXU, or QXU) more than one time so that the packet's context can be further processed within a particular execution unit. Each time a packet context is passed through an execution unit for processing, the packet context is said to be "stroked." By passing a packet context multiple times (i.e., once stroked; twice stroked; thrice stroked, etc.) through the stages of an execution unit of the NPU, the stroking process also allows the efficient reuse of the particular execution stage, and thereby permits the physical size of the systolic array for an execution unit of the NPU to be reduced.

Recall that each stage 66 of an execution unit is programmatic so that the stages can perform different operations on the packet context as the packet context is passed through the particular execution unit multiple times. In this manner, as the packet context is stroked or passed through the execution unit, the stages 64 of the execution unit perform different operations on the packet context each time the packet context is processed therein. For instance, depending on how the LXU 30 is programmed, in a three stroke process through the LXU, during the first pass of the context through the LXU, the stages of the LXU 30 can be programmed to perform processing operations 1-8; during the second pass of the context through the LXU 30, the stages of the LXU perform program processing operations 9-16; and during the third pass of the context through the LXU 30, the stages of the LXU perform program processing operations 17-24. Since the stages of an execution unit are efficiently re-used by stroking, such a stroking process reduces the need for a larger systolic array execution unit, which can save space on the integrated circuit.

In one example, the NPU 20 receives a new packet from the network every 3 cycles, and accordingly, the packet contexts being stroked (in one example, a packet context is passed a total of 3 times through an execution unit) can be stroked through an execution unit of the NPU during the available cycles between the cycles when another packet is received. In this way, the stroking of packet contexts within an execution unit would not affect the NPU's ability to accept and process new packets received from the network at line rate, while affording each packet context the needed amount of processing within the execution unit. Further, the resources of the execution units of the NPU are efficiently used and the sizes of the execution units of the NPU are reduced.

Referring to FIG. 13, an example is shown of a four stage (64A-64D) systolic array pipeline 22 wherein each packet context is stroked twice. Assuming that a new packet context arrives every 3 cycles for processing, it can be seen that at cycle 4, packet 1 (shown as P1-1) is completing processing in the fourth stage (64D) of the systolic array during its first stroke, as packet 2 (shown as P2-1) is arriving in the first stage (64A) of the systolic array. After stage 1 (64A) completes its operations on packet 2 (P2-1) at cycle 5, packet 2 moves to stage 2, and packet 1 (now shown as P1-2) can be introduced into stage 1 to begin its second stroke through the systolic array. At cycle 7, a new packet 3 (P3-1) is introduced into the systolic array in the first stage (64A), and at cycle 8, packet 1 (P1-2) is processed in the fourth stage (64D) on its last stroke in this example. In cycle 8, packet 2 (P2-2) is also introduced into stage 1 (64A) to begin its second stroke. At the completion of cycle 8 (64D), packet 1 has completed processing in the systolic array. At cycle 10, a new packet 4 (P4-1) is introduced into the systolic array 64A, and at cycle 11, packet 2-(P2-2) is processed in the fourth stage 64D on its last stroke in this example. In cycle 11, packet 3 (P3-2) is also introduced into stage 1 64A to begin its second stroke.

It can be seen that in the example of FIG. 13, packet context 40 data can be stroked within the systolic array 22 while new packet contexts are introduced into the systolic array without contention. It can also be seen that at steady state (i.e., after the systolic array has been filled with packet contexts), the systolic array 22 of FIG. 13 can accept a new packet every 3 cycles and can output a processed packet every 3 cycles. In this example, if the operating frequency of the systolic array, and the number of stages 64 of the systolic array and number of strokes therein, is set to permit sufficient time to perform the lookup operation for a packet within the systolic array, then the systolic array would then also produce a processed packet at the line rate during steady state operations. It is understood that FIG. 13 represents an example of a systolic array 22 in accordance with one embodiment of the present invention, and that the number of stages 64 used in the systolic array and the number of strokes utilized therein is a matter of choice depending upon the particular implementation.

For instance, at a 10 gigabit/sec line rate (e.g., OC192) where the shortest IP packet has 40 bytes, this translates to 30 million packets/sec. Where there are four media adapters 46 per NPU (i.e., four packet streams of 10 gigabits/sec into the NPU), this translates to 120 million packets/sec into the NPU 20. If the NPU runs at a rate of 375 MHz, then [375 MHz/(120 million packets/sec)] means that the NPU 20 would receive a new packet every 3 clock cycles of the NPU. If the NPU runs at a rate of 500 MHz, then the NPU would receive a new packet every 4 clock cycles.

Referring now to FIG. 14, one example of the PXU 28 systolic array pipeline is illustrated. As shown in FIG. 14, the PXU systolic array in one embodiment includes 25 active stages 66 (shown as unshaded blocks), and eight sleep stages 84 (shown as shaded blocks) in the main portion of the systolic array pipeline. As data moves through the PXU 28 systolic array, the output of the PXU systolic array (i.e., the packet context 40 being formed) can either be passed to the input of the LXU 30 systolic array, or can be run through ("stroked") again through the PXU 28 pipeline if further processing of the context is needed. The stroke control 94 shown in FIG. 14 controls the multiplexer 95 of the PXU which is used to arbitrate or select packet contexts into the systolic array without collision.

As discussed above, the PXU 28 parses the packet header to extract the IP destination address and the QoS information for the packet, which form the first partial packet context. In one embodiment, the PXU also performs a pre-fetching function which launches a memory access to the forwarding table 36 to begin the lookup process, such that the results of the memory access will be available to the front end active stages of the LXU 30 systolic array. In one example, the PXU accesses forwarding table memory 36 with the destination address (i.e., the first 12 bits of the packet's destination address) of the packet to determine the root node for the packet. The results of the root node are returned in time to be used by the front-end of the LXU.

Further, the PXU 28 includes a priming function wherein registers of the first partial packet context are pre-loaded with values by the header sequencer 38 so that those register values do not have to be loaded under program control, thereby saving systolic array resources.

The first partial packet context 40 from the PXU 28 is then transmitted to the LXU 30, which performs a forwarding table look-up using the packet context (in its current form) to determine which queue to assign the packet to. Accordingly, the packet context generated from the LXU 30 includes the assigned queue for the packet.

FIG. 15 illustrates one example of the systolic array for the LXU 30, in accordance with one embodiment of the present invention. As shown in FIG. 15, the LXU has in one example a plurality of sleep stages 84 (shown as shaded blocks) followed by a plurality of active stages 66 (shown as shaded blocks), with this structure repeating throughout the systolic array of the LXU. Again, the LXU receives the packet context 40 data from the PXU 28, or receives the packet context from its stroke control 96 within the LXU 30. The LXU systolic array output either provides the processed context 40 to the QXU 32 systolic array, or continues to process the context by passing the context to the top of the systolic array of the LXU (stroking). The stroke control 96 shown in FIG. 15 controls the multiplexer 97 of the LXU which is used to arbitrate or select packet contexts into the systolic array without collision.

The LXU 30 is implemented as a systolic array pipeline that provides pipelined processing of a packet context 40. In one embodiment, multiple packet contexts may be in process within the systolic array at the same time. One advantage of the systolic array is that the forwarding table look-up is performed at the line rate. Therefore, the forwarding table look-up operations are performed without first cellifying the packets and storing the cells in memory, which provides for higher throughput of packets through the router than previous designs would allow.

Figure 18:
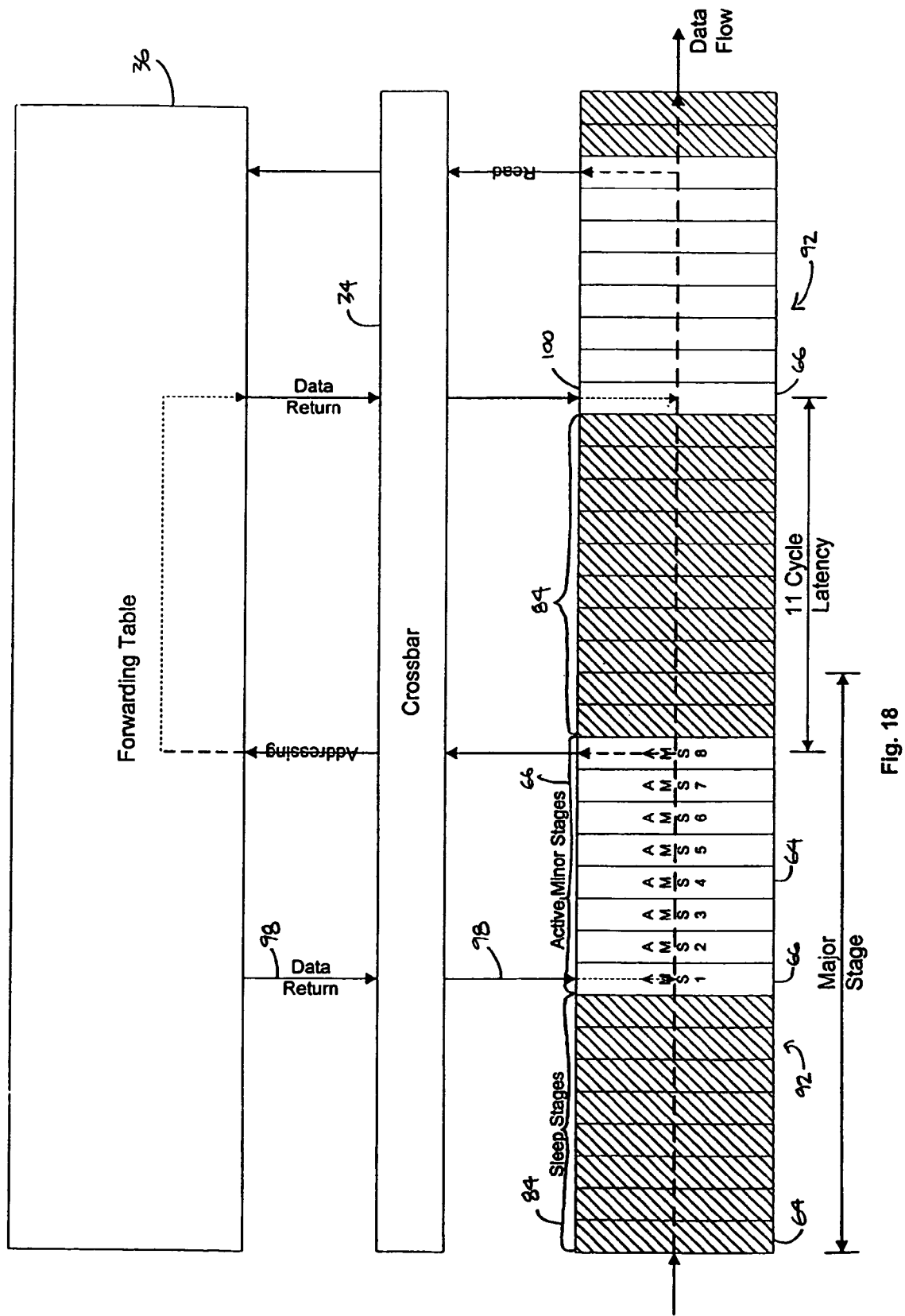
FIG. 18 illustrates an embodiment of a look-up engine and communication paths between the look-up engine and a forwarding table, the look-up engine being a look-up systolic array pipeline having a first major stage and a second major stage, with each major stage having at least one inactive minor stage and at least one active minor stage, in accordance with one embodiment of the present invention.

In processing the packet context 40 and referring to FIGS. 17-18, a major stage 92 of the LXU 30 includes a data return 98 from the forwarding table 36 that was generated from a read in the preceding major stage, operations on the data returned, and a read of the forwarding table 36 that will result in a data return to the next major stage. As shown in FIG. 18, a first active minor stage (AMS1) receives the data return 98 from the forwarding table 36 generated by the preceding major stage. Following the first active minor stage, are six minor stages (AMS 2-AMS 7) that determine the address of the next read of the forwarding table, i.e., which node of the trie to examine next). An eighth active minor stage (AMS8) then generates the read of the correct memory address in the forwarding table. In one embodiment, there is a latency of 11 cycles between when a read request is sent to the forwarding table 36 from the systolic array, i.e., from the eighth active minor stage (AMS8), and when data is returned from the forwarding table to the systolic array, i.e., the first active minor stage 100 of the following major stage. Accordingly, 10 inactive minor stages are placed between the minor stage where the read request is sent to the FT (AMS8) and where data is returned. Two of the inactive minor stages are arranged at the end of a major stage, and eight of the inactive minor stages are arranged at the beginning of a major stage.

The inactive minor stages 84 move data from the preceding minor stage into the next minor stage, and move data from the inactive minor stage to the subsequent minor stage during each cycle. The inactive minor stages are implemented in the systolic array pipeline 22 to keep data moving through the array every cycle, even if no operations are being performed on the data during the cycle, moving from stage to stage every cycle. The systolic array is scaleable to allow adjustments for changes in the forwarding table lookup latency, either in the forwarding table 36 itself or in getting data to and from the forwarding table, by adjusting the number of inactive minor 84 stages to adapt for the latency. As discussed above, in one example the latency is 11 cycles, and therefore 10 inactive minor stages are located between the active major stage performing the read operation (AMS8) and the active minor stage 100 receiving the data corresponding to the read.

Stroking is possible within the systolic array 22 because a new packet does not have to be accepted each cycle to maintain the line rate. Rather, as discussed above, a packet enters the systolic array every third cycle at 375 Mhz for the three-stroke embodiment (or every four cycles at 500 Mhz in a four-stroked embodiment). Therefore, in one embodiment, there are two slots open every three cycles for first partial packet contexts passing through the systolic array on the second and third strokes, and one stroke open for new first partial packet contexts entering the pipeline. The number of strokes is set in the look-up engine 30 by the route processor 52, with the default being three strokes.

In one embodiment, packets can arrive into the systolic array of the LXU 30 from the parsing engine 28 at any time. Since contexts 40 may already exist in the systolic array, scheduling logic and additional buffering is provided to support variable context entry in the systolic array and prevent collisions between existing contexts and a new context. In one embodiment, to optimize packet entry, the PXU 28 parsing engine schedules packets to enter the systolic array on fixed 3 or 4 cycle boundaries (variable under route processor 52 control, as with the stroke count). This provides for simplified systolic array stroking because contexts will enter the systolic array on a fixed schedule. Therefore, stroked contexts reenter the beginning of the systolic array on the cycles that new contexts are not entering the systolic array. Accordingly, in the one embodiment there is a scheduling buffer for temporarily buffering contexts for two cycles before entry into the systolic array.

Referring again to FIG. 15, in addition to the 12 major stages 92, the LXU 30 systolic array includes a plurality of staging inactive minor stages 102 (sleeps) where the number of staging sleeps provides a total number of cycles in the stroke that is not divisible by 3 or 4 (the number is prime), in one example. The number of staging sleeps is a function of the number of total cycles in the pipeline as well as the rate at which new packets can arrive (for the three-stroke embodiment, 1 new packet every three cycles).

In one embodiment, the beginning of the systolic array pipeline of the LXU 30 includes a first staging sleep 104 that receives the context from a return staging sleep 106 at the end of the pipeline, i.e., a packet context being processed on the second or third stroke. The return sleep and the first staging sleep are implemented for timing isolation.

Referring now to FIG. 16, one embodiment of the systolic array for the QXU 32 is illustrated, in accordance with one embodiment of the present invention. As shown in FIG. 16, the QXU's systolic array receives processed context data 40 from the LXU 30, or receives context to be further processed within the QXU pipe from the QXU's stroke control 99. The stroke control shown in FIG. 16 controls the multiplexer 108 of the QXU which is used to arbitrate or select packet contexts into the systolic array without collision.

The QXU 32 completes the generation of the packet context 40, and unifies the context with the packet from the packet buffer 42, so that the packet and the packet context can be processed by the remaining portions of the router. In one embodiment, a packet context 40 makes three strokes through the QXU. During the first stroke, the metering function can be performed for packets that use metering, in one embodiment. During the second stroke, metering computations are completed, and the meter time stamps and other data can be stored.

Further, a table can be accessed to determine the absolute value of the queue in the router to which the packet will be sent. In one example, a table is accessed which takes an index and 64 possible values which map to an offset number which, when added to the base queue number, will return the absolute value of the queue in the router to which the packet will be sent. The index can be derived from the context as received from the LXU 30, as well as the value of the meter computed during the first stroke of the QXU 32, in one embodiment. The queue offset is added to the base queue number from the context register, and the result obtained is placed in the context register for downstream consumption within the router.

During the third stroke within the QXU 32, packets may receive an adjustment to the length field of the context register. Further, the context may contain flags indicating whether the packet header is an IP or MPLS header. An NPU check sum may be written to the end of the packet so that other portions of the router can verify the NPU check sum when receiving the data, in one embodiment.

It can be seen that because the stages 64 of the PXU 28, LXU 30, QXU 32 process data sequentially, in one embodiment, the packets are processed and maintained in correct order relative to one another.

Forwarding Table Memory

Referring now to FIG. 17, the forwarding table (FT) 36 is a memory array including the IP destination addresses serviced by the router. Generally, each router that is connected with the router has its IP destination address stored in the forwarding table 36. The FT is, in one embodiment, implemented in a 2 MB on-chip SRAM organized as 32 sectors 110 having 16 4096-byte blocks 112 or 1024 32-bit words, with each word corresponding to a node of the trie. The 2 MB on-chip SRAM is placed on the same chip as the systolic array 22, which results in less latency between when a memory address in the FT is read and when data from that memory address is returned to the systolic array. Further, an on-chip FT allows multiple concurrent accesses to the FT, thus allowing multiple lookups to proceed in parallel. Prior art forwarding tables are generally located off-chip, which creates a greater latency between forwarding table reads and forwarding table data returns, and also severely limits the available bandwidth.

In one example, each major stage of the LXU 30 systolic array uses its own address space. To facilitate the address space requirements of the systolic array, the FT is partitioned into a plurality of sectors 110 defining a plurality of blocks 112. The amount of memory needed by each stage 66, however, is dynamic, because the IP destination addresses stored in the FT change as the network topology changes. Accordingly, the sectors 110 and blocks 112 are mapped to each stage with shared, differential low swing buses 34 (the "crossbar") to facilitate communication between the stages and all of the sectors and blocks.

The FT 36 as illustrated in the example of FIG. 17 is divided into 2 halves, each containing 16 read ports. This facilitates a high read bandwidth between the systolic array 22 and the FT. In one embodiment, the FT is implemented as a Double Data Rate SRAM. Each major pipeline stage 92 drives a read address to both halves of the FT, and a mutliplexor connects a first data bus from the first half and a second data bus from the second half to each major stage 92. In one embodiment, one of the systolic array major stages sends a 19-bit read address to the FT, the 19 bit read address including a 5-bit sector select, a 4-bit block select, and a 10-bit entry select. The read address maps to a memory segment (i.e., node) of each half of the FT, with each memory segment returning a 17-bit data return (i.e., the pointer to the next node of the trie to search) that are muxed together resulting in a 34-bit data input into the following major stage.

The 16 FT read ports communicate with sectors using a plurality of shared, differential, low swing buses. Collectively, the buses are called the crossbar 34, because they connect all sectors to all FT read ports. Read address ports drive onto shared crossbar buses terminating at sectors. Each FT 36 read data port has its own dedicated crossbar bus that is shared by the sectors. The write address and data are transported with a full swing bus.

Each 64 KB sector 110 includes two read ports and one write port 114, in one example. One FT read address crossbar bus is dedicated to each sector read address port. Within a sector, addresses and data are transported to blocks 112 as full swing signals, and read output data is returned over shared, differential, low swing buses. Each 4 KB block contains 1024 34-bit (includes 2 parity bits) entries, in one example. The 4 KB granularity is a function of the trade-off between the maximum number of blocks that can access the sector's low swing bus and the amount of memory that is unused by blocks using only one of their entries. The blocks 112 are implemented as a standard SRAM block, and can perform one read or one write per cycle. FT writes take precedence over reads. If a read address and write address select the same block, the write is performed. In this situation, the read operation will return the data just written.

In one embodiment, each FT read port is controlled by 1 major LXU pipeline stage 92, and each of the 64 sector read ports 114 is mapped to 1 of the FT's 16 read ports. Within a sector 110, each block 112 is mapped to one of the sector's two read ports. All sector write ports are connected to the FT write port, and all block write ports are connected to their sector's write port in one example.

As illustrated in FIG. 18, the FT read and data return operations have a 11 cycle latency with 2-cycle latency for transmission of the FT read address, 7-cycle latency for the reading of the FT, and a 2-cycle latency for the data return. Accordingly, there are 11 cycles, corresponding to the two sleep stages at the end of the preceding major stage and eight cycles at the beginning of the succeeding major stage, between when the first major stage makes a read request and the data is returned to the following major stage.

In one embodiment, the FT 36 communicates with the LXV systolic array 30 through the crossbar 34, which connects all FT read ports to sector read ports. The FT has an address crossbar and a data crossbar. A high-speed bus may be used to communicate between the systolic array and FT. In addition, dynamic mapping requires that any stage can be assigned to any sector port; therefore, the buses are muxed. In one example, the FT 36 delivers 34 bits of data to each pipeline stage every cycle at 375 Mhz. In one embodiment, the crossbar 34 is implemented as a tristate, differential, low swing bus. Alternatively, the crossbar can be implemented using static combinational logic.

In one embodiment, particular stages of the systolic array 30 are adapted to launch memory accesses to the forwarding table SRAM 36 so that the results from the memory access will be available to stages downstream in the systolic array. These stages which may be dedicated to memory accesses can be spaced throughout the systolic array so that the intermediate stages can perform other operations while the memory access is in flight. The different stages may access the forwarding table SRAM 36 through multiple ports to the FT SRAM.

Look-Up Procedure

The LXU 30 performs a trie search of the forwarding table 36 to make a longest prefix match between the IP destination address from the first partial packet context and from a plurality of IP destination prefixes stored in the forwarding table 36. For a large packet-switched network, such as the Internet, not every final destination for a packet is stored in the forwarding table. Accordingly, the router seeks to transmit the packet to a connected router that will most likely have the final destination for the packet in its forwarding table. This is achieved by making a longest prefix match between the IP destination address of the packet and the various IP destination prefixes stored in the forwarding table. For example, if the IP destination address for the packet is 99.123.99.90, and the forwarding table defines queues for IP destination prefixes 99.123.0.0/16 and 99.123.99.0/24, where the /16 and /24 define the length of the corresponding prefix, then the longest prefix match will determine that the packet 99.123.99.90 should be assigned to the queue corresponding to 99.123.99.0/24. One lookup-process is described with reference to FIGS. 19-21, in accordance with one embodiment of the present invention.

The IP destination prefixes serviced by the router are stored in the forwarding table 36 of the NPU 20 as a trie 118, which is a data structure used to perform the longest prefix match.

In general, the forwarding table look-up operations include searching the trie 118 to obtain the longest-prefix match between the IP destination address associated with the packet and the address of a node 120 in the trie. The address of the node in the trie associated with the longest prefix match provides, in one embodiment, an index into an off-chip SRAM 116 (FIG. 3), which includes the base destination queue of the outgoing interface and the encapsulation identification (EID) for the packet. Hence, the on-chip SRAM 36 is used to quickly complete the lookup, while the off-chip SRAM 116 is used to obtain the related data for the packet once the destination has been determined.

Accordingly, the nodes 120 of the trie 118 are searched by the LXU 30, to find the node with an IP destination prefix that most closely matches the IP destination address for the packet being routed, and the port of the router associated with that node is assigned to the packet.

Each trie includes one or more nodes 120 connected together by a series of branches 122. For instance, in the example of FIG. 19, there are two root nodes 124 shown (there may be many more root nodes in an actual implementation), and from each root node emanates various branches 122, depending on the data received from the RP 52 regarding the real-time topology of the network.

The forwarding table look-up process generally involves a search of the trie 118 to find a node 120 that best matches the IP destination address for the packet (i.e., the longest prefix match). The search includes an analysis of the node to determine which branch to take. The search continues until the longest prefix match is found, and the queue associated with that node is assigned to the packet. To provide for increased efficiency in searching the trie (i.e., to consume more bits at each node), one embodiment includes both a variable text string feature and multiple branches (2, 4, 8, and 16) per node.

Each node 120 defines a text string, an R-bit, an IP destination address, and a B-field. The text string is variable and is the address of the node, and it is used to match with the IP destination address for the packet. The R-bit indicates whether or not the router supports the route associated with the node (i.e., if the R-bit is set for a node, then a port of the router is associated with this node). The B-field indicates the number of branches associated with the node, a node can indicate 2, 4, 8, or 16 branches. In one embodiment, the forwarding table 36 includes nodes with 2, 4, 8, and 16 branches. In one example, a 0-0 in the B-field indicates two branches, a 0-1 in the B-field indicates four branches, a 1-0 in the B-field indicates eight branches, and a 1-1 in the B-field indicates 16 branches. A trie 118 can be used that looks at one character per node, two characters per node, etc. All the nodes of the trie of the FT can have a fixed number of braches (i.e., 2-way, 4-way, 8-way, and 16-way), or the nodes can be hybrid with different nodes having different branching factors. In one embodiment, a hybrid trie is used.

Figure 21:
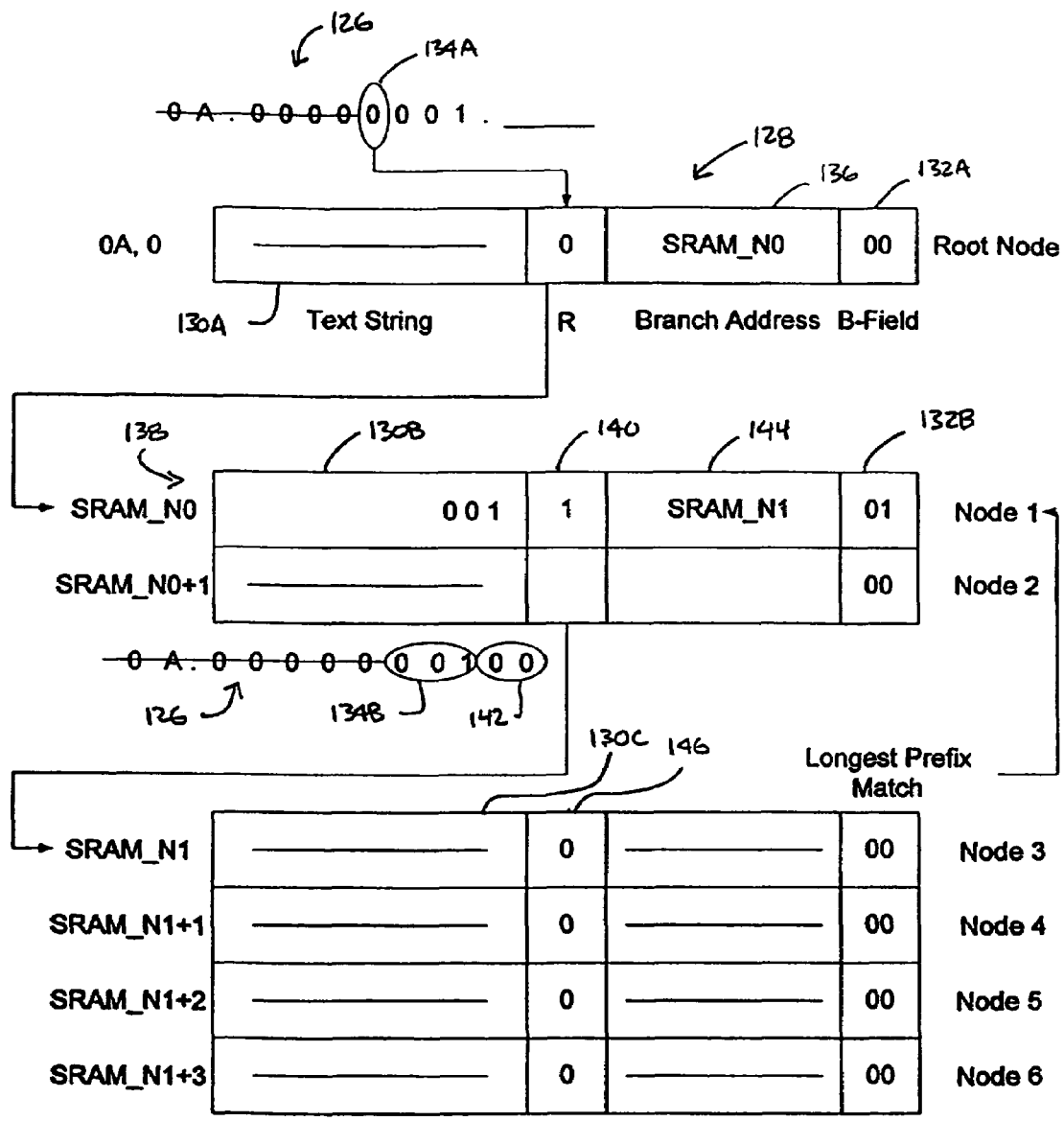
FIG. 21 illustrates an example of a trie search, which corresponds with the trie illustrated in FIG. 19.

FIG. 21 conceptually illustrates a portion of an exemplary trie 118 according to one embodiment of the present invention. In this example, the base or root node is a 12 bit address 00001010.0000 (0A.0) having a first branch connected with node 1 and a second branch connected with node 2. The address of the node 1 is SRAM_N0, and because the root node has only two branches, the address of the second node is SRAM_N0+1. The R-bit for node 1 is set to 1, which indicates that there is an output port associated with node 1. Node 1 has four branches, the first branch being connected with node 3 (address=SRAM_N1), the second branch being connected with node 4 (address=SRAM_N1+1), the third branch being connected with node 5 (address=SRAM_N1+2), and the fourth branch being connected with node 6 (address=SRAM_N1+3).

Figure 20:
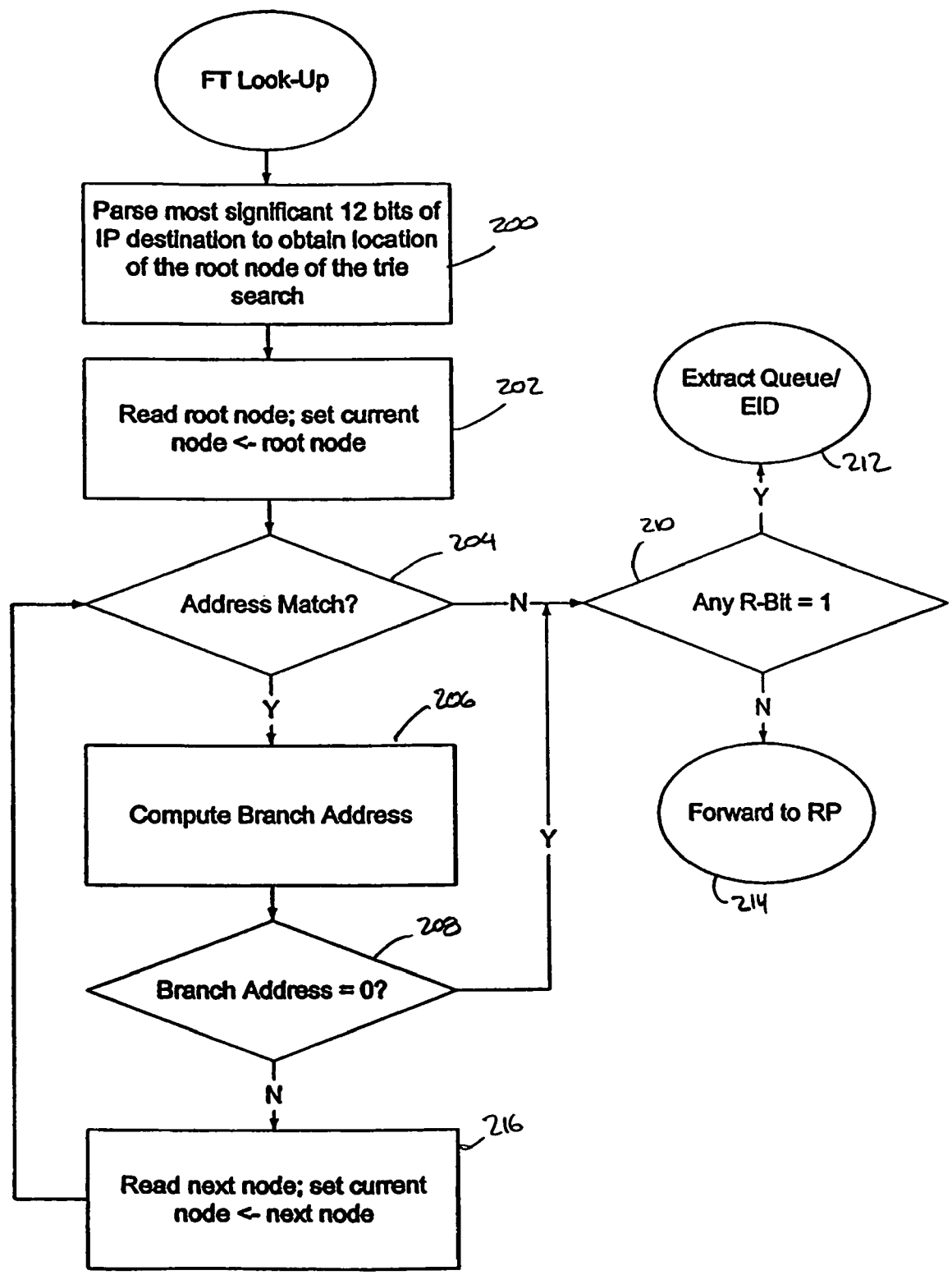
FIG. 20 illustrates the logical operations for performing a lookup operation, in accordance with one embodiment of the present invention.

FIG. 20 illustrates one method of searching the trie to obtain the longest prefix match. In operation 200, the most significant 12 bits are parsed from the IP destination address to obtain the location of the root node of the trie search. In one example, the PXU 28 generates the first read (of the root node) into the FT SRAM 36, which returns the next node to search to the first major stage 9 of the LXU 30.

In operation 202, the root node is read. Initially, the root node is marked as the current node for subsequent operations. In operation 204, it is determined whether there is a match between the IP destination address for the packet and the contents of the current node. If there is a match, then, in operation 206, the current node is read to obtain a branch address, which is the address of the next node in the trie search. Generally, there is only one branch address for a node. The next most significant bit(s) is used to determine which branch to take. For example, in a two branch node with no text string embedded in it, the 13th bit is examined to determine which branch to take. If the 13th bit is zero, then the branch address points to the next node to search; and, if the 13th bit is one, then the branch address for the next node to search is branch address+1. By providing multiple branches per node, more than one bit is consumed per node, which makes the trie search more efficient by requiring less steps. Multiple branches per node are provided when the trie beneath the node is fairly dense. For example, consider the root node with no text string, if there is a node for the 13th and 14th bit, (00, 01, 10, and 11), then it is beneficial to define a four branch node for the root node in order to move forward in the trie search in one step rather than in two steps if there were only two branches (13th bit 0 and 1).

In operation 208, it is determined whether the branch address is zero. An address of zero indicates that the node is a leaf node and there are no nodes deeper in the trie to search, i.e., there are no branches connected with a node having a branch address of zero. If the branch address is zero, then, in operation 210, it is determined whether any node searched during the trie search is mapped to a physical port, which is indicated by the R-bit being set to 1. If such a node exists, then, in operation 212, its address is used to find the base destination queue and the EID for that IP destination address. Otherwise, in operation 214, the packet is forwarded to the RP 52 to decide how that packet should be handled.

Beginning with the root node, each node searched thereafter matches some portion of the IP destination address. For example, the root node matches the first 12 bits of the IP destination address. In operation 210, if at least one of the nodes searches includes an R-bit of 1, then the address of the node having the longest prefix match is assigned to the packet. The node with the longest prefix match is the node having an address wherein the most bits, from left to right, match the IP destination address for the packet. The assigned address for the packet provides an index into the off-chip SRAM 116 wherein the memory space associated with the index has a base destination queue and an EID for the packet, which are read and incorporated into the context for the packet.

In operation 208, if the branch address is non-zero, then in operation 216 the branch is taken, and the next node is read. The node is marked as the current node, and the trie search continues at operation 204. In operation 204, if there is no match, then in operation 210, as previously discussed, it is determined whether any of the nodes searched have an R bit=1.

Figure 19:
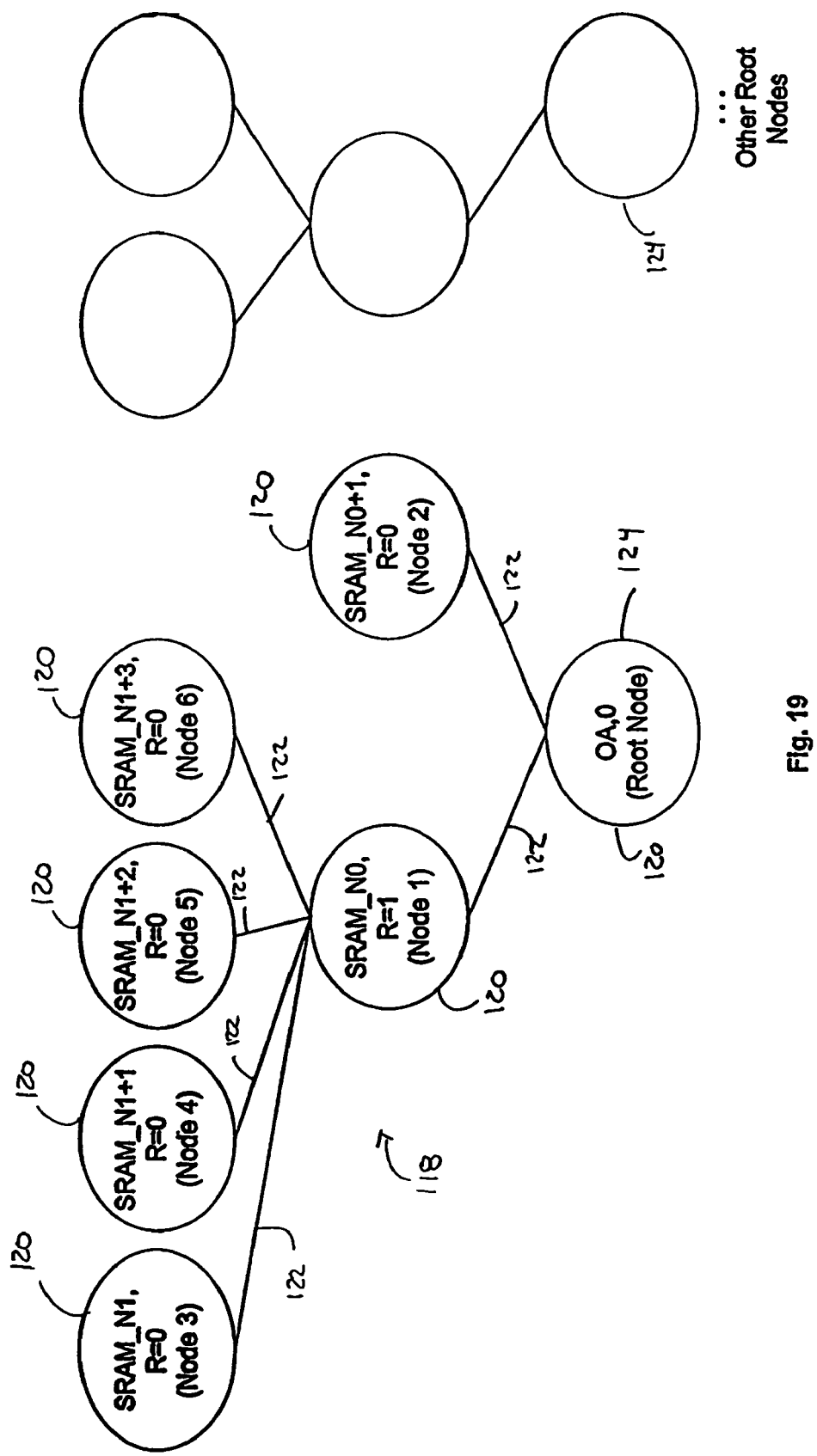
FIG. 19 illustrates an example of a trie used in the lookup process, in accordance with one embodiment of the present invention.

Referring to FIG. 21, an illustrative exemplary trie search is presented, which corresponds with the conceptual trie illustrated in FIG. 19. In this example, the IP destination address for the packet is 0A.01.02.03 (Hex) 126 or (00001010.00000001.00000010.00000011 Binary). Accordingly, the first node 128 searched in the trie, i.e., the root node, is 0A.0 (00001010.0000) corresponding with the first 12 bits of the IP destination address. In this example, the text string 130A for the root node is null, and it is a two-branch node indicated by 00 in the B-field 132A. Accordingly, only the 13th bit 134A, i.e., the next most significant bit is checked for the next branch. In this example, the 13th bit is 0; accordingly, the address of the next node in the trie is SRAM_N0 136. Had the 13th bit been 1, then the address of the next node to search in the trie would be SRAM_N0+1.

The next node (SRAM_N0) 138 has a text string (130B) 001, the R-bit 140 is set to 1, and there is 01 in the B-field 132B indicating it is 4-branch node. Accordingly, in this example, the next three bits 134B, bits 14-16 of the IP destination address are compared with the text string, which is a match. Next, the following two bits 142 of the text string, bits 17 and 18, are used to determine which branch of the node to take, in this example bits 17 and 18 are both 0, accordingly SRAM_N1 (144) is the address of the next node. Had, for example, bit 17 been 1 and bit 18 been 0, "10" in binary (corresponding with decimal 2), then the SRAM_N1+2 would be the address of the next node. SRAM_N1 has a zero, or null pointer, in the address or textstring 130C portion of the node. Accordingly, this node is the last node, or leaf node, in the trie to search. The node, however, is not mapped to an output port, i.e., R=0 (146). Accordingly, the longest prefix match, in this example the preceding node SRAM_N0, is assigned to the packet. The address of this node, maps into the off-chip SRAM, in one example, to extract the base destination queue for the packet and the EID for the packet.

Recirculation within the NPU

Within the NPU 20, and referring now to FIG. 2, recirculation of packets allows a variable amount of processing of the packet context within the processor using the systolic array, and such recirculation is performed under program control. In one example, a recirculation packet queue 52 is provided which stores the context of a packet to be recirculated so that, in view of the current network traffic being received at the front end of the NPU, the packet can be inserted into the NPU pipeline at the appropriate moment for further processing. As shown in FIG. 2, the recirculation packet queue is coupled with the IPA 48, and the IPA selects recirculated packet contexts for introduction into the systolic array in a manner similar to that described above with reference to RP generated packets.

For example, a packet can be recirculated within the NPU 20 if the packet is a "tunnel" packet which has layers of formatting data encapsulated about the packet. In one example, the NPU processes the outer layer of the context of the tunnel packet during a first pass through its stages, and the NPU recognizes that the packet is a tunnel packet with multiple layers of data thereabout. The packet context is then recirculated 52—by placing the packet context in the recirculation packet queue—so that the packet context can be further processed in the NPU to examine the next layer of the tunnel packet. These operations can be repeated until all of the needed information about the packet has been obtained and analyzed by the NPU. In this manner, the NPU can process tunnel packets (or other packets which need variable amounts of processing) without substantially affecting the rate at which other packets are processed by the NPU. Recirculation of packets through the NPU may also be useful for packets which are of the IPV6 type.

Hence, in accordance with embodiments of the present invention, the input processing unit determines the destination of a received packet by using a systolic array architecture which supports packet processing at the line rate.

While the methods disclosed herein have been described and shown with reference to particular operations or steps performed in a particular order, it will be understood that these operations or steps may be combined, sub-divided, or re-ordered to form equivalent methods without departing from the teachings of the present invention.

While the invention has been particularly shown and described with reference to various embodiments, it will be understood by those skilled in the art that various other changes in the form and details may be made without departing from the spirit and scope of the invention.

The invention claimed is:

1. A processor for use in a router receiving data packets from a network, the router having a plurality of input ports and output ports, each data packet having a header and a body, the processor comprising:
   one or more input buffers for receiving data packets from the input ports of the router;
   a packet buffer for storing the body of each of the data packets, wherein the packet buffer includes an input packet arbiter to examine the data packets; and
   a systolic array pipeline for processing the header of each of the data packets to determine to which output port the data packets should be routed.

2. The processor of claim 1, wherein the systolic array pipeline includes a plurality of stages, and wherein a number of the plurality of stages includes at least one register file and at least one functional unit, wherein the functional unit is an adder.

3. A network processing unit for determining a destination of a packet comprising:
- means for receiving data packets from input ports of the router;
- means for storing the body of each of the data packets; and
- means for processing a header of each of the data packets to determine to which one of an output port the data packets should be routed, wherein the means for processing comprises a systolic array pipeline with a plurality of stages capable of stroking each of the data packets, and wherein a number of the plurality of stages includes at least one register file and at least one functional unit.

4. A processor for use in a router receiving data packets from a network, the router having a plurality of input ports and output ports, each data packet having a header and a body, the processor comprising:
- means for receiving data packets from the input ports of the router;
- means for storing the body of each of the data packets;
- means for stroking each of the data packets; and
- means for processing the header of each of the data packets to determine to which output port the data packets should be routed, wherein the means for processing includes at least a first stage having a first register file and a second stage having a second register file, wherein the second register file receives an image of the first register file.

5. The processor of claim 4, wherein the means for processing includes a plurality of stages, and wherein a number of the plurality of stages includes at least one register file and at least one functional unit.

6. The processor of claim 5, wherein the at least one functional unit is an adder.

7. The processor of claim 5, wherein the at least one functional unit is a shifter.

8. A network processing unit for determining a destination of a packet, the unit comprising:
- a parsing execution unit for forming a packet context which contains a destination address and descriptive data of the packet;
- a lookup execution unit for determining a destination port of a router to which the packet is to be routed; and
- a queuing execution unit for queuing the packet to an output queue corresponding to the destination port, wherein the parsing, lookup and queuing execution units are implemented using one or more programmable stages of a systolic array, and wherein operations of the parsing, lookup and queuing execution units are dynamically controllable.

9. A method of processing a packet, the method comprising:
- extracting a header from the packet;
- processing the header with a parsing execution unit to form a packet context of information relating to the packet;
- determining a destination port using the packet context and a lookup execution unit, wherein the lookup execution unit comprises systolic array stages allowing programmable control;
- modifying the packet context to reflect results of determining the destination port;
- merging the modified packet context with the packet; and
- writing to an output queue corresponding to the destination port.

10. The method of claim 9 wherein the packet context comprises a destination address contained in the packet header.

11. The method of claim 9 which comprises storing the packet while determining a destination port.

12. The method of claim 9 wherein processing the header with the parsing execution unit comprises extracting information comprising one or more of a source address, destination address, source port number, destination port number and packet type quality of service data from the header.

13. The method of claim 12 which comprises storing the extracted information in a register file.

14. The method of claim 13 wherein the lookup execution unit receives the extracted information via the register file.

15. The method of claim 9 which comprises performing quality of service and filtering operations using the lookup execution unit based upon the packet context.

16. The method of claim 9 wherein the systolic array stages include major stages and minor stages.

17. A machine-readable medium embodying instructions which, when executed by a machine cause the machine to:
- extract a header from a packet;
- process the header with a parsing execution unit to form a packet context of information relating to the packet;
- determine a destination port using the packet context and a lookup execution unit, wherein the lookup execution unit comprises systolic array stages allowing programmable control;
- modify the packet context to reflect results of determining the destination port;
- merge the modified packet context with the packet; and
- write to an output queue corresponding to the destination port.

* * * * *

UNITED STATES PATENT AND TRADEMARK OFFICE
CERTIFICATE OF CORRECTION

PATENT NO. : 7,418,536 B2
APPLICATION NO. : 11/326253
DATED : August 26, 2008
INVENTOR(S) : Leung et al.

It is certified that error appears in the above-identified patent and that said Letters Patent is hereby corrected as shown below:

On the Title Page Item (56) on page 2, under "Other Publications", line 15, delete "Speed"," and insert -- Speeds", --, therefor.

On the Title Page Item (56) on page 2, under "Other Publications", line 35, delete "Proceedings," and insert -- Proceeding, --, therefor.

On the Title Page Item (56) on page 2, under "Other Publications", line 47, delete "(Saptember" and insert -- (September --, therefor.

On the Title Page Item (56) on page 2, under "Other Publications", line 56, delete "Heirarchy" and insert -- Hierarchy --, therefor.

On the Title Page Item (56) on page 3, under "Other Publications", line 8, after ""Fast" insert -- and --.

On the Title Page Item (56) on page 3, under "Other Publications", line 2, delete "he" and insert -- the --, therefor.

In the Drawings on sheet 6 of 22, in Fig. 6, line 1, delete "Addr" and insert -- Adder --, therefor.

In the Drawings on sheet 9 of 22, in Fig. 8B (Box. 76A), delete "ADDR" and insert --ADDER --, therefor.

In the Drawings on sheet 9 of 22, in Fig. 8B (Box. 76B), delete "ADDR" and insert -- ADDER --, therefor.

In the Drawings on sheet 11 of 22, in Fig. 10, line 3, delete "Addr" and insert -- Adder --, therefor.

In the Drawings on sheet 11 of 22, in Fig. 10, line 6, delete "Addr" and insert -- Adder --, therefor.

UNITED STATES PATENT AND TRADEMARK OFFICE
CERTIFICATE OF CORRECTION

PATENT NO. : 7,418,536 B2
APPLICATION NO. : 11/326253
DATED : August 26, 2008
INVENTOR(S) : Leung et al.

It is certified that error appears in the above-identified patent and that said Letters Patent is hereby corrected as shown below:

In column 11, line 62, delete "12B" and insert -- 72B --, therefor.

In column 15, line 60, delete "next)." and insert -- next. --, therefor.

In column 18, lines 9-10, delete "mutliplexor" and insert -- multiplexor --, therefor.

Signed and Sealed this

Eleventh Day of November, 2008

JON W. DUDAS
*Director of the United States Patent and Trademark Office*